United States Patent
Ono et al.

(10) Patent No.: US 8,513,893 B2
(45) Date of Patent: Aug. 20, 2013

(54) HIGH-PRESSURE DISCHARGE LAMP LIGHT-UP DEVICE, HIGH-PRESSURE DISCHARGE LAMP APPARATUS USING SAME, PROJECTOR USING HIGH-PRESSURE DISCHARGE LAMP APPARATUS, AND LIGHT-UP METHOD FOR HIGH-PRESSURE DISCHARGE LAMP

(75) Inventors: Syunsuke Ono, Osaka (JP); Hiroji Morimoto, Nara (JP); Minoru Ozasa, Kyoto (JP); Masahiro Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 13/376,817

(22) PCT Filed: Jun. 10, 2010

(86) PCT No.: PCT/JP2010/003870
§ 371 (c)(1),
(2), (4) Date: Dec. 7, 2011

(87) PCT Pub. No.: WO2011/074151
PCT Pub. Date: Jun. 23, 2011

(65) Prior Publication Data
US 2012/0074858 A1 Mar. 29, 2012

(30) Foreign Application Priority Data
Dec. 14, 2009 (JP) .................. 2009-283094

(51) Int. Cl.
*H05B 41/231* (2006.01)
*G03B 21/14* (2006.01)

(52) U.S. Cl.
USPC ....... 315/209 R; 315/246; 315/287; 315/291; 353/85; 353/84

(58) Field of Classification Search
USPC ............... 315/209 R, 291, 165, 287, 246, 85, 315/59, 224, 307, 289, 308
See application file for complete search history.

(56) References Cited

U.S. PATENT DOCUMENTS

| | | | |
|---|---|---|---|
| 5,608,294 A | 3/1997 | Derra et al. | |
| 6,232,725 B1 | 5/2001 | Derra et al. | |
| 6,794,832 B2 * | 9/2004 | Yamamoto et al. | 315/307 |
| 7,023,144 B2 * | 4/2006 | Suzuki et al. | 315/246 |
| 7,138,867 B2 | 11/2006 | Suzuki et al. | |
| 7,170,237 B2 * | 1/2007 | Suzuki et al. | 315/246 |

(Continued)

FOREIGN PATENT DOCUMENTS

| | | |
|---|---|---|
| JP | 2002-532866 | 10/2002 |
| JP | 3738712 | 2/2003 |

(Continued)

*Primary Examiner* — Vibol Tan

(57) ABSTRACT

A high-pressure discharge lamp lighting device that suppresses deterioration and the expansion of inter-electrode distance in a pair of electrodes within a high-pressure discharge lamp, more effectively than conventional technology. The frequency of the AC current supplied to a high-pressure discharge lamp alternates between a first frequency and a second, higher frequency, while the magnitude of the AC current alternates between a first value and a second, higher value. The suppressing effect is realized by repeatedly alternating the frequency and repeatedly alternating between a first period at the first frequency and a second period at the second frequency, with the second, higher-magnitude current being used in the latter and the first current being used in the former.

18 Claims, 22 Drawing Sheets

(56) References Cited

U.S. PATENT DOCUMENTS

| | | | |
|---|---|---|---|
| 7,622,869 B2 | 11/2009 | Watanabe et al. | |
| 7,845,805 B2 | 12/2010 | Okamoto et al. | |
| 7,855,512 B2 * | 12/2010 | Ozasa et al. | 315/49 |
| 7,880,398 B2 * | 2/2011 | Ozasa et al. | 315/224 |
| 8,063,572 B2 * | 11/2011 | Ozasa et al. | 315/224 |
| 8,324,828 B2 * | 12/2012 | Yamamoto et al. | 315/291 |
| 8,450,937 B2 * | 5/2013 | Yamamoto et al. | 315/209 R |
| 8,459,802 B2 * | 6/2013 | Ono et al. | 353/85 |
| 2007/0164687 A1 | 7/2007 | Watanabe et al. | |
| 2011/0210680 A1 * | 9/2011 | Yamamoto et al. | 315/209 R |

FOREIGN PATENT DOCUMENTS

| | | |
|---|---|---|
| JP | 3794415 | 2/2005 |
| JP | 2005-190766 | 7/2005 |
| JP | 3741727 | 2/2006 |
| JP | 2006-059790 | 3/2006 |
| JP | 2006-120654 | 5/2006 |
| JP | 3851343 | 11/2006 |
| JP | 2006-332015 | 12/2006 |
| JP | 2007-87637 | 4/2007 |
| JP | 2008-146837 | 6/2008 |
| JP | 2008-269804 | 11/2008 |

* cited by examiner

FIG. 10

| Lighting time (h) | Luminance maintenance factor (%) | | | Inter-electrode distance increase factor (%) | | |
|---|---|---|---|---|---|---|
| | Sample case 1 | Comparative case 1 | Comparative case 2 | Sample case 1 | Comparative case 1 | Comparative case 2 |
| 0 | 100.0 | 100.0 | 100.0 | 100 | 100 | 100 |
| 100 | 95.0 | 90.0 | 78.0 | 106 | 111 | 122 |
| 250 | 88.0 | 78.0 | 67.0 | 113 | 122 | 136 |
| 500 | 78.0 | 66.0 | 53.0 | 122 | 133 | 147 |
| 750 | 71.0 | 60.0 | 47.0 | 128 | 139 | 155 |
| 1000 | 67.0 | 56.0 | 42.0 | 133 | 144 | 158 |
| 1500 | 62.0 | 52.0 | | 139 | 148 | |
| 2000 | 57.0 | 47.0 | | 143 | 151 | |
| 2500 | 54.0 | 42.0 | | 146 | 153 | |
| 3000 | 51.0 | | | 148 | | |
| 3500 | 48.0 | | | 152 | | |
| 3800 | 47.0 | | | 154 | | |

FIG. 14

| Lighting time (h) | Luminance maintenance factor (%) | Inter-electrode distance increase factor (%) |
|---|---|---|
| | Sample case 2 | Sample case 2 |
| 0 | 100.0 | 100 |
| 100 | 96.0 | 104 |
| 250 | 89.0 | 111 |
| 500 | 80.0 | 120 |
| 750 | 73.8 | 125 |
| 1000 | 69.1 | 130 |
| 1500 | 65.0 | 135 |
| 2000 | 60.0 | 140 |
| 2500 | 56.0 | 144 |
| 3000 | 52.0 | 147 |
| 3500 | 49.0 | 151 |
| 3800 | 48.0 | 152 |

HIGH-PRESSURE DISCHARGE LAMP LIGHT-UP DEVICE, HIGH-PRESSURE DISCHARGE LAMP APPARATUS USING SAME, PROJECTOR USING HIGH-PRESSURE DISCHARGE LAMP APPARATUS, AND LIGHT-UP METHOD FOR HIGH-PRESSURE DISCHARGE LAMP

TECHNICAL FIELD

The present invention pertains to a high-pressure discharge lamp lighting device, a high-pressure discharge lamp apparatus using the device, a projector using the high-pressure discharge lamp apparatus, and a high-pressure discharge lamp lighting method.

BACKGROUND ART

Projectors are used for presentations in school classrooms, meeting rooms and the like, as well as in private home theatres. As a light source, such projectors use a high-pressure discharge lamp that is nearly a point light source. In particular, high-pressure mercury lamps are used.

A high-pressure mercury lamp encloses a halogen substance along with mercury, and includes an arc tube in which a pair of tungsten electrodes are disposed in mutual opposition. Light is radiated by the emission of an arc discharge between the electrodes. In a high-pressure mercury lamp, the halogen cycle is used to constrain the blackening effect produced during lighting. The blackening effect refers to the tungsten making up the electrodes evaporating and coming to adhere to the inside of the arc tube. The tungsten so evaporated is made to return to the electrodes through the halogen cycle, and comes to accumulate. As such, given a protrusion formed by such accumulation on the tip portions of both electrodes, the luminescent spots of the arc discharge spanning the inter-electrode distance are the two protrusions.

In recent years, demand for ever-increasing longevity in the high-pressure mercury lamp serving as the light source has grown alongside projector use. As a response to such demand, an effective method has been discovered in preserving the stability of the arc discharge by maintaining an appropriate shape in the protrusions formed on the tip portions of the pair of electrodes.

One proposed method for forming and maintaining an appropriate shape for said protrusions involves a high-pressure discharge lamp lighting device configured to switch between two or more frequencies for the AC current supplied to the high-pressure mercury lamp (see, for example, Patent Literature 1). Patent Literature 1 describes causing growth in the protrusions by applying suitable AC current in at least one frequency, and causing reduction in the protrusions by applying suitable AC current in other frequencies. The shape of the protrusions is thus preserved by repeatedly alternating between the frequencies to cause growth and reduction.

CITATION LIST

Patent Literature

[Patent Literature 1]
  Japanese Patent No. 3851343

SUMMARY OF INVENTION

Technical Problem

However, in conventional high-pressure mercury lamps, when the lamp has undergone lighting for a long aggregate time (hereinafter, aggregate lighting time), the tip portions of the electrodes gradually deteriorate due to the aggregate effect of tungsten evaporating from the electrode tip portions to accumulate elsewhere, leading to a widening inter-electrode distance. As a result, the amount of light radiating onto the reflector required for use as a projector light source is attenuated due to the expansion of the lamp discharge area. Advanced attenuation of the radiated light is effectively the end of the lamp life span.

Also, upon conducting lighting tests using the high-pressure discharge lamp lighting device described in Patent Literature 1, the present inventors have found that, despite appropriately forming and preserving protrusions on the tip portions of the electrodes over the entire aggregate lighting time, the protrusions of tip portions of the electrodes deteriorate as the aggregate lighting time goes on. Ultimately, inter-electrode distance expansion is unavoidable. Therefore, as described above, the light radiated from the reflector used in a projector is attenuated, and advanced attenuation is effectively the end of the lamp life span.

In consideration of the above, the present invention aims to provide a high-pressure discharge lamp lighting device, a high-pressure discharge lamp apparatus using the device, a projector using the high-pressure discharge lamp apparatus, and a high-pressure discharge lamp lighting method that suppress deterioration in the tip portions of the pair of electrodes and also suppress expansion of the inter-electrode distance to a greater degree than conventional technology.

Solution to Problem

The high-pressure discharge lamp lighting device pertaining to the present invention lights a high-pressure discharge lamp by supplying alternating current thereto, the high-pressure discharge lamp having an arc tube in which a halogen substance is enclosed and in which a pair of electrodes are disposed, each of the electrodes having a tip portion on which a protrusion is formed, and comprises: a frequency switching unit switching a frequency of the alternating current supplied to the high-pressure discharge lamp between a first frequency and a second frequency in accordance with a frequency control signal, the second frequency being higher than the first frequency; a current switching unit switching a magnitude of the alternating current between a first current magnitude and a second current magnitude in accordance with a current control signal, the second current magnitude being greater than the first current magnitude; and a control unit inputting the frequency control signal to control the frequency switching unit and inputting the current control signal to control the current switching unit, wherein controlled by the control unit, the frequency switching unit introduces a period A of providing the alternating current at the first frequency and a period B of providing the alternating current at the second frequency, the periods repeating in alternation, and controlled by the control unit, the current switching unit switches, for one half-cycle of the alternating current at the first frequency, between the second current magnitude for a portion of period A and the first current magnitude for a remainder of period A.

Also, the high-pressure discharge lamp apparatus pertaining to the present invention comprises: a high pressure discharge lamp having an arc tube in which a halogen substance is enclosed and in which a pair of electrodes are disposed, each electrode having a tip portion on which a protrusion is formed, and the high-pressure discharge lamp lighting device lighting the high-pressure discharge lamp.

Also, a projector pertaining to the present invention comprises the high-pressure discharge lamp.

Also, a high-pressure discharge lamp lighting method pertaining to the present invention for lighting a high-pressure discharge lamp by supplying alternating current thereto, the high-pressure discharge lamp having an arc tube in which a halogen substance is enclosed and in which a pair of electrodes are disposed, each of the electrodes having a tip portion on which a protrusion is formed, comprises the steps of: switching a frequency of the alternating current between a first frequency and a second frequency, the second frequency being higher than the first frequency, and switching a magnitude of the alternating current between a first current magnitude and a second current magnitude, the second current magnitude being greater than the first current magnitude; wherein a period A of providing the alternating current at the first frequency and a period B of providing the alternating current at the second frequency repeat in alternation, and for one half-cycle of the alternating current at the first frequency, the second current magnitude is provided for a portion of period A and the first current magnitude is provided for a remainder of period A.

Advantageous Effects of Invention

According to the above-described structure, the high-pressure discharge lamp lighting device is able to form and maintain appropriate protrusions through period A, in which AC current is supplied at the first frequency, and period B, in which AC current is supplied at a second frequency higher than the first frequency, repeated in alternation so as to alternately apply a growth effect and a reduction effect to the protrusions, which are formed on tip portions of the electrodes. Furthermore, during a subset of half-cycles within period A, in which low-frequency AC current is provided, a second current having a higher magnitude than the first current is provided. Thus, the temperature of the tip portion serving as a base is temporarily elevated along with that of the protrusion of each electrode. This temporary temperature elevation promotes accumulation of tungsten not only in the protrusions but also in the tip portions of the electrodes. Accordingly, deterioration of the tip portions of the electrodes is suppressed an expansion of the inter-electrode distance is, in turn, suppressed. The specific reasoning underlying this result is described later.

Accordingly, the above-described high-pressure discharge lamp lighting device constrains deterioration in the tip portions of electrodes to a greater extent than conventional technology.

Also, the above-described high-pressure discharge lamp lighting method produces effects similar to those of the lighting device.

According to the present invention, a high-pressure discharge lamp lighting device, a high-pressure discharge lamp apparatus using the device, a projector using the high-pressure discharge lamp apparatus, and a high-pressure discharge lamp lighting method that constrain deterioration in the tip portions of the pair of electrodes and also constrain expansion of the inter-electrode distance to a greater degree than conventional technology are provided.

BRIEF DESCRIPTION OF DRAWINGS

FIG. 10 is a table showing the change in a luminance maintenance factor and in an inter-electrode distance increase factor over time during the lighting test.

FIG. 11A is a graph explaining the relationship of lighting time to the luminance maintenance factor, while

FIG. 14 is a table showing the change in the luminance maintenance factor and in the inter-electrode distance increase factor over time during the lighting test.

FIG. 15A is a graph explaining the relationship of lighting time to the luminance maintenance factor, while

DESCRIPTION OF EMBODIMENTS

Embodiments of the present invention are described in detail with reference to the drawings.

Embodiment 1

Figure 1:
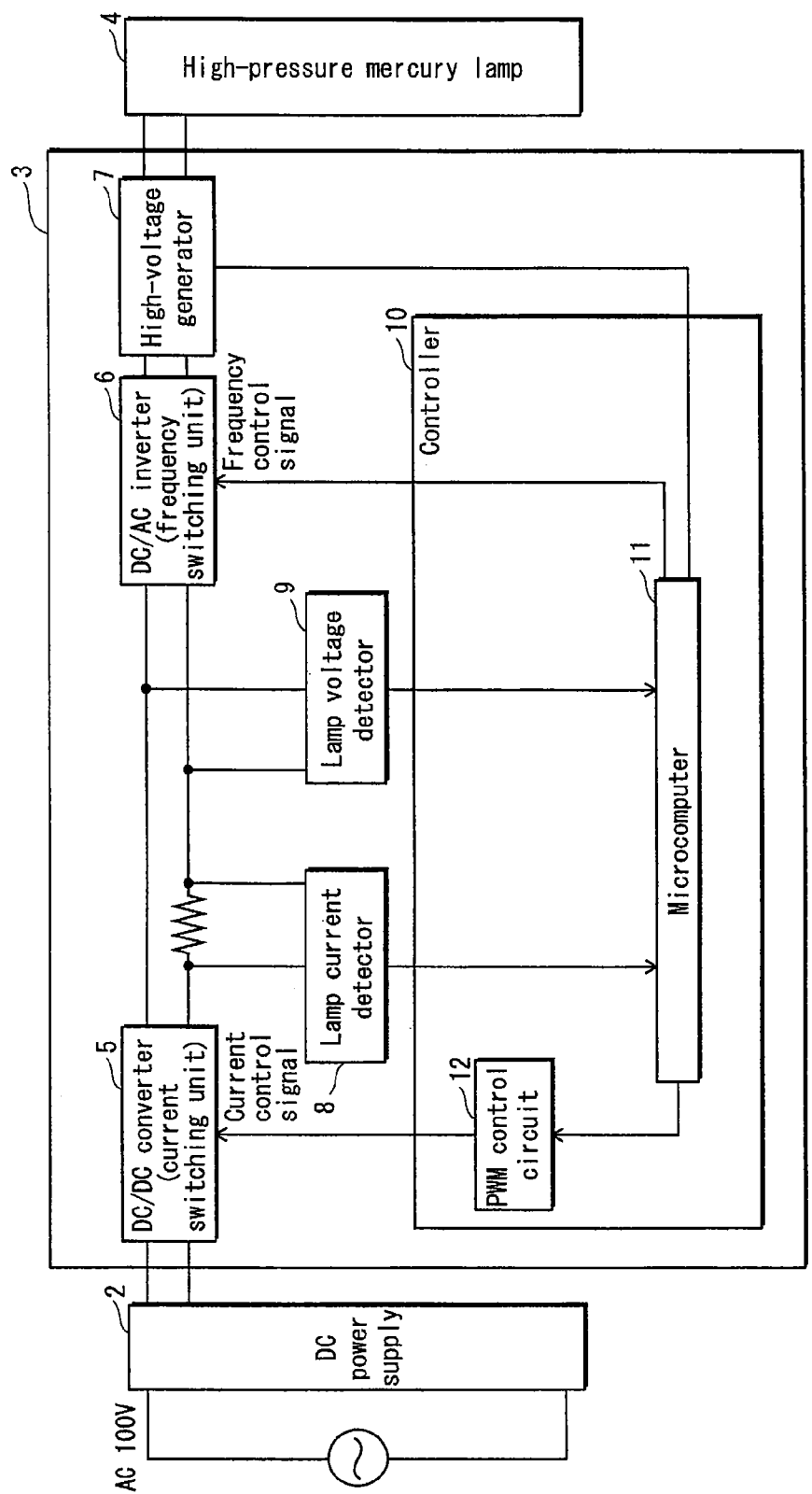
FIG. 1 is a block diagram showing the configuration of a high-pressure discharge lamp apparatus pertaining to Embodiment 1 of the present invention.

FIG. 1 is a block diagram of a high-pressure discharge lamp apparatus 1 serving as Embodiment 1 of the present invention.

As shown, the high-pressure discharge lamp apparatus 1 is made up of a DC power supply 2, a high-pressure mercury lamp 4 having a power rating of 360 W, and a lighting device 3 (electronic ballast) connected between the DC power supply 2 and the high-pressure mercury lamp 4.

The DC power supply 2 has, for example, a rectifier, and generates constant DC voltage from household AC voltage (100 V) to supply the lighting device 3.

The lighting device 3 converts the DC power supplied by the DC power supply 2 into AC power to, in turn, supply the high-pressure mercury lamp 4.

The high-pressure mercury lamp 4 is lit by the AC power supplied by the lighting device 3.

(Lighting Device Configuration)

The principal configuration of the lighting device 3 includes a DC/DC converter 5, a DC/AC inverter 6, a high-voltage generator 7, a lamp current detector 8, a lamp voltage detector 9, and a controller 10. Also, the controller 10 further includes a microcomputer 11 and a PWM (Pulse Width Modulation) control circuit 12.

The DC/DC converter 5 has an input terminal, an output terminal, and a control terminal. The input terminal is connected to the DC power supply 2. The output terminal is connected to the DC/AC inverter 6. The control terminal is connected to the PWM control circuit 12. The DC/DC converter 5 is under PWM control, and generates DC power at a magnitude corresponding to a PWM control signal (current control signal) input to the control terminal.

To be exact, control (constant power control) must be performed for steady lighting (constant lighting) so as to maintain the lamp power that is to stabilize the light output of the high-pressure mercury lamp 4 at a constant level. To this end, the controller 10 has the microcomputer 11 calculate the lamp power according to the lamp current detected by the lamp current detector 8 and the voltage detected by the lamp voltage detector 9, and then sends a PWM control signal (current control signal) from the PWM control circuit 12 to the DC/DC converter 5 so as to keep the lamp power constant. Upon reception, the DC/DC converter 5 converts the DC current from the DC power supply 2 into DC current of corresponding magnitude.

This structure allows the DC/DC converter 5 to function as a current switching unit, switching between currents of different magnitudes.

The controller 10 sends the PWM control signal (current control signal) so as to cause the DC/DC converter 5 to execute constant current control during the low-voltage period beginning immediately after lamp initialization and ending when the lamp is fully lit. The term "constant current control" is herein used to signify not only control keeping the current value constant, but also to general current control applied, for example, in order to prevent overcurrent in the lamp during the low-voltage period before the lamp is fully lit, and including times when the current value is not constant. However, the term does not include the constant power control performed after the lamp is fully started.

The DC/AC inverter 6 has an input terminal, an output terminal, and a control terminal. The input terminal is connected to the DC/DC converter 5. The output terminal is connected to the high-pressure mercury lamp 4 via the high-voltage generator 7. The control terminal is connected to the microcomputer 11. The DC/AC inverter 6 generates AC current as a substantially square wave at a frequency fitting the frequency control signal input to the control terminal. Concretely speaking, the DC/AC inverter converts the DC current output by the DC/DC converter 5 into AC current as a substantially square wave.

According to this structure, the DC/AC inverter 6 functions as a frequency conversion unit.

Here, the AC current is described as a substantially square wave. This term naturally includes current in a perfect square wave, and also includes square waves somewhat distorted by over- or under-shooting immediately after polarity reversal.

The high-voltage generator 7 includes a (non-diagrammed) transformer generating and applying high voltage to the high-pressure mercury lamp 4 at initialization.

The lamp current detector 8 detects current (equivalent to lamp current) running in lines connecting the DC/DC converter 5 to the DC/AC inverter 6. The lamp current detector 8 then outputs a signal indicating the magnitude of the lamp current to the microcomputer 11.

The lamp voltage detector 9 detects the voltage output by the DC/DC converter 5 and, in turn, outputs a signal indicating the lamp voltage level to the microcomputer 11. The voltage output by the DC/DC converter 5 is not exactly equivalent to the lamp voltage due to the voltage drops imparted by the DC/AC inverter 6, the high-voltage generator 7, the circuit lines, and so on. However, any voltage drop other than that of the lamp itself is corrected for by subtraction, allowing the DC/DC converter 5 to be treated as the lamp voltage in control processing.

Upon receiving the signals output by the lamp current detector 8 and the lamp voltage detector 9, the microcomputer 11 arithmetically computes the lamp power and the difference between the lamp power and a predetermined power value, then outputs the resulting difference value to the PWM control circuit 12. The PWM control circuit 12 produces a PWM signal composed of a duty pulse (ON/OFF switching) based on the difference value. The PWM control circuit 12 inputs the PWM control signal so produced to the DC/DC converter 5, exerts PWM control over the DC/DC converter 5, and thus controls the magnitude of the current supplied to the high-pressure mercury lamp 4.

The microcomputer 11 inputs a preset frequency control signal to the DC/AC inverter 6, thereby controlling the frequency of the AC current supplied to the high-pressure mercury lamp 4.

(High-Pressure Mercury Lamp Configuration)

Figure 2:
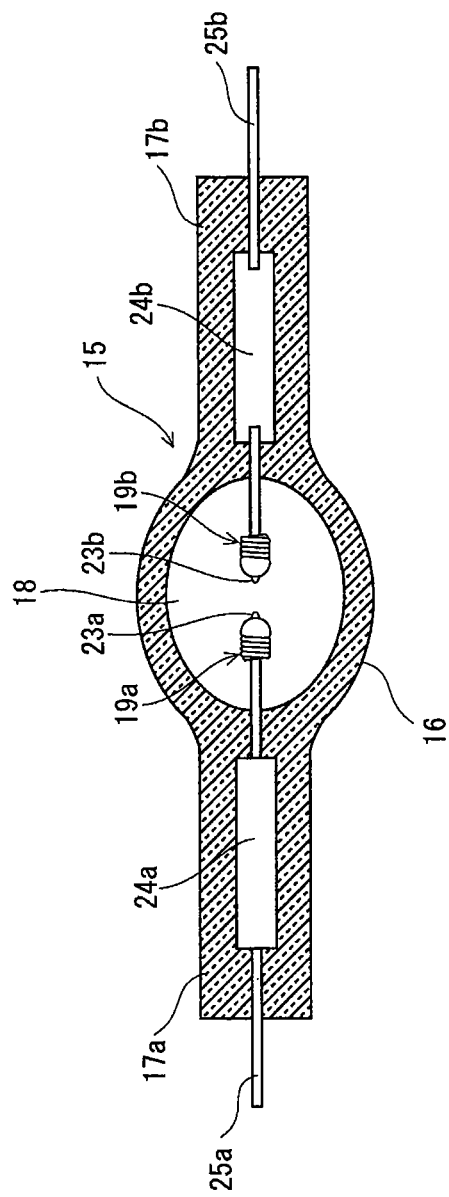
FIG. 2 is a partially cut away cross-sectional diagram showing the overall configuration of a high-pressure mercury lamp.

The overall configuration high-pressure mercury lamp 4 is described next, with reference to FIG. 2.

As shown, the high-pressure mercury lamp 4 includes an arc tube 15 having a light-emitting part 16 substantially shaped as an ellipsoid of revolution and sealing parts 17a and 17b disposed at either side of the light-emitting part 16. The arc tube 15 is made of silica glass, for example. The arc tube 15 has a discharge space 18 formed therein. The discharge space 18 includes mercury (Hg) acting as the light-emitting material, a noble gas such as argon (Ar), krypton (Kr), xenon (Xe), or a compound gas including two or more of these elements acting as a start-up aid, as well as iodine (I), bromine (Br), or a compound of the two for the halogen cycle. Predetermined amounts of each of the above are sealed inside. For example, the enclosed volume of mercury may range from 150 mg/cm$^3$ to 390 mg/cm$^3$, the enclosed pressure of argon gas may range from 0.01 MPa to 1.00 MPa (at 25° C.), and the enclosed concentration of bromine may range from $1\times10^{-10}$ mol/cm$^3$ to $1\times10^{-4}$ mol/cm$^3$, but is preferably within a range of $1\times10^{-9}$ mol/cm$^3$ to $1\times10^{-5}$ mol/cm$^3$.

In addition, the discharge space 18 includes a pair of electrodes 19a and 19b disposed opposite one another along a substantially common axis. The electrodes 19a and 19b are made of tungsten (W) and are electrically connected to exterior lead wires 25a and 25b through molybdenum (Mo) plating 24a and 24b hermetically sealed on sealing parts 17a and 17b.

Figure 3:
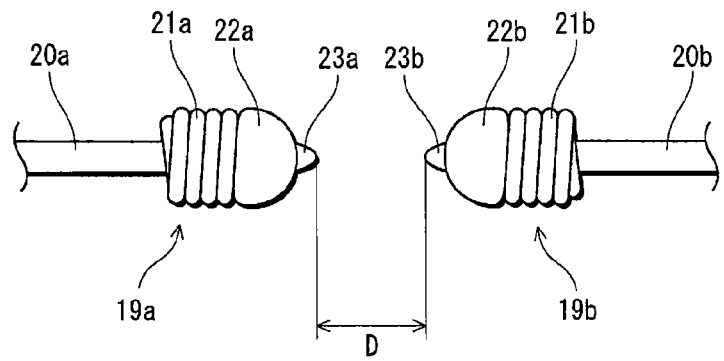
FIG. 3 is a diagram describing the configuration of electrodes.

As shown in FIG. 3, the electrode 19a includes an electrode rod 20a, an electrode coil 21a attached to one end of the electrode rod 20a, and a tip portion 22a that is substantially hemispherical and is welded to the electrode rod 20a and to a portion of the electrode coil 21a. In addition, a protrusion 23a is formed on the tip portion 22a. The protrusion 23a is self-forming and requires no mechanical processing, being produced during lighting when tungsten evaporates from the electrode 19a and returns via the halogen cycle to accumulate on the electrode 19a. The electrode 19b is configured identically to the electrode 19a and has a protrusion 23b formed on the tip portion 22b. The protrusions 23a and 23b serve as arc spots for the electrodes 19a and 19b, being separated by inter-electrode distance D. The inter-electrode distance D is, for example, set so as to fall within a range of 0.5 mm to 2.0 mm. In FIG. 2, protrusions formed during manufacturing are shown, indicating the shape of the protrusions when manufacture is completed.

The tip portions 22a and 22b of the electrodes 19a and 19b are not limited to a hemispherical shape and may also be, for example, substantially spherical, conical, or otherwise. Also, when the tip portions of the electrodes are formed, a substantially hemispherical, spherical, conical, or similar shape may be prepared in advanced, carved out or sintered, and made to adhere to the tip portion of the electrode rod. This is an alternative to welding a portion of the electrode rod and a portion of the electrode coil.

When forming the substantially hemispherical tip portions 22a and 22b by welding a portion of the electrode rods 20a and 20b and the electrode coils 21a and 21b of the electrodes 19a and 19b, the portion the tip of the electrode rods 20a and 20b may be shaped so as to be substantially hemispherical, spherical, conical, and so on, and the portion may remain protruding without any welding having taken place thereon. In such a case, the protruding portion is likely to overheat and undergo near-total fusion upon first lighting. However, given that a part thereof remains, the accumulation of tungsten through the halogen cycle during lighting is selectively facilitated in the protruding portion, and the self-formation of the protrusions 23a and 23b at the peak of the tip portions 22a and 22b is made more likely to occur correctly.

(Lamp Unit Configuration)

Figure 4:
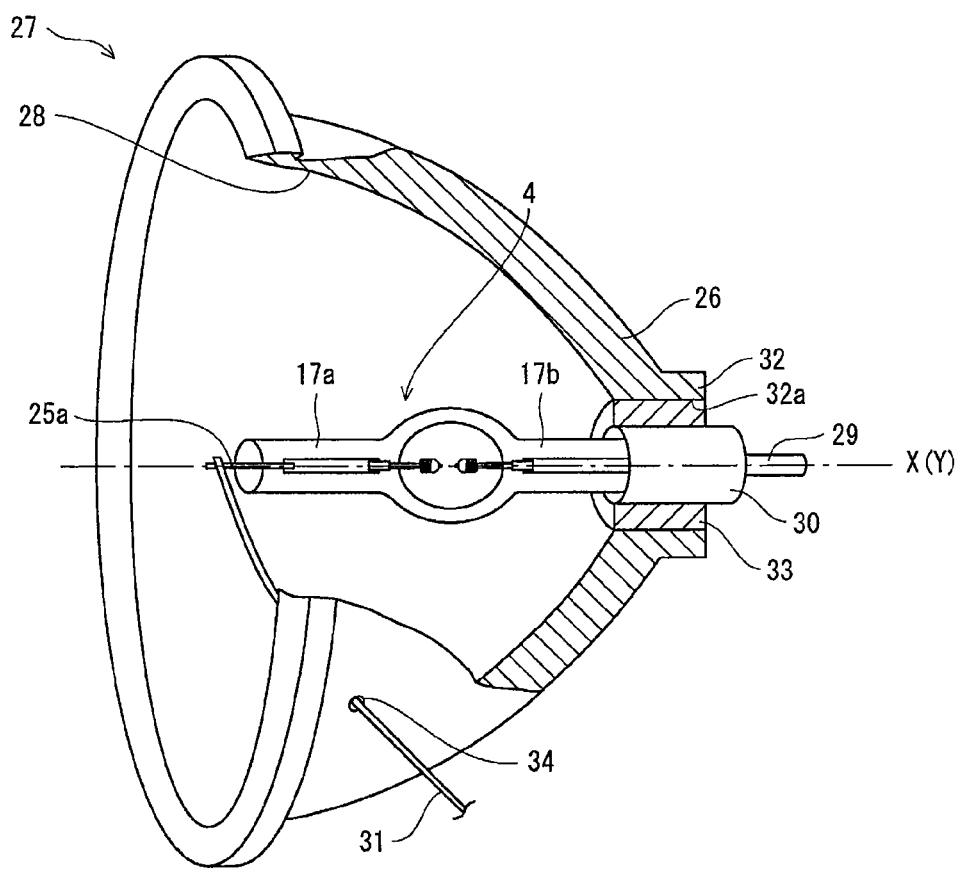
FIG. 4 is a partially cut away perspective diagram showing the configuration of a lamp unit in which the high-pressure mercury lamp is integrated.

As shown in FIG. 4, the high-pressure mercury lamp 4 is made up of a reflector 26 that integrates a lamp unit 27.

The lamp unit 27 is made up of a concave reflective surface 28 disposed on the inner face of the reflector 26. The reflector 26 is configured so that the longitudinal central axis X of the integrated high-pressure mercury lamp 4 substantially corresponds to the optical axis Y of the reflector 26. Accordingly, the light radiating from the high-pressure mercury lamp 4 is reflected by the reflective surface 28 in a configuration that enhances the collection efficiency. The body of the reflector 26 is, for example, made of glass or metal. The reflective surface 28 is, for example, the surface of an ellipsoid of revolution or of a paraboloid of revolution, or even a free-form surface, and is formed by deposition or by spattering on a multilayer interference membrane.

Also, the reflector 26 has a neck portion 32 that, in turn, has a through-hole 32a passing through the bottom of the reflective surface 28.

One of the sealing parts 17b of the arc tube 15 of the high-pressure mercury lamp 4 has a cylindrical base 30 mounted thereon, connected to a lighting device connection terminal 29. The lighting device connection terminal 29 is connected to one of the (non-diagrammed) exterior lead wires extending from the sealing part 17b. The other one of the sealing parts 17b has an exterior lead wire 25a that is connected to a power supply wire 31 for connection to the lighting device.

The high-pressure mercury lamp 4 has the base 30 inserted into the neck portion 32 of the reflector 26 and fixed by an adhesive 33. At this point, the power supply wire 31 is inserted through the through-hole 34 formed in the reflector 26, continuing through to outside the reflector 26.

Figure 5:
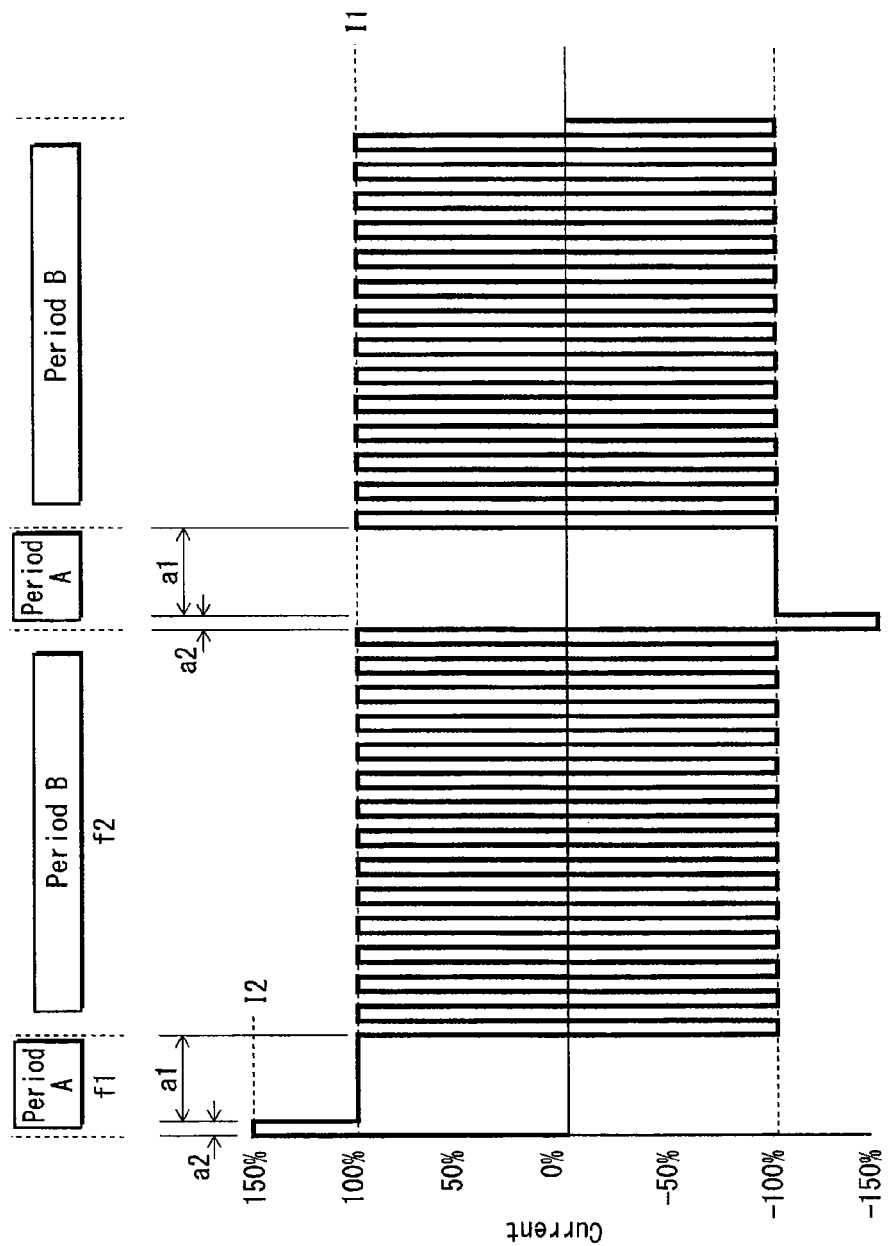
FIG. 5 is a wave diagram showing an example of an AC current for a constant lighting state of the high-pressure mercury lamp.

Before describing the lighting device 3 pertaining to Embodiment 1, a specific example is given of the AC current waveform output by the lighting device 3, with reference to FIG. 5. The later-described operations of the lighting device 3 are explained as an example of operations for outputting the AC current waveform illustrated in FIG. 5.

(AC Current Waveform Example)

FIG. 5 is a waveform diagram illustrating an example of AC current as output by the lighting device 3.

The AC current waveform shown in FIG. 5 is made up of frequency f1 (first frequency) over period A (FIG. 5 shows a cycle of 0.5) and of frequency f2 (second frequency) over period B, repeating in alternation. Also, the current having a magnitude of ±100% is considered a first current (current value I1) while the current having a magnitude of ±150% is considered a second current (current value I2). The second current is supplied during period a2 within period A, while the first current is supplied during the remainder, i.e., period a1. Period a2 begins at the onset of period A and lasts until a predetermined time has elapsed. Period a1 begins when period a2 ends and lasts until the end of period A. The magnitude of the current during period B is current value I1.

(Lighting Device Operations)

An example of the operations of the lighting device 3 pertaining to Embodiment 1 are described below, with reference to the flowchart shown in FIG. 6.

Figure 6:
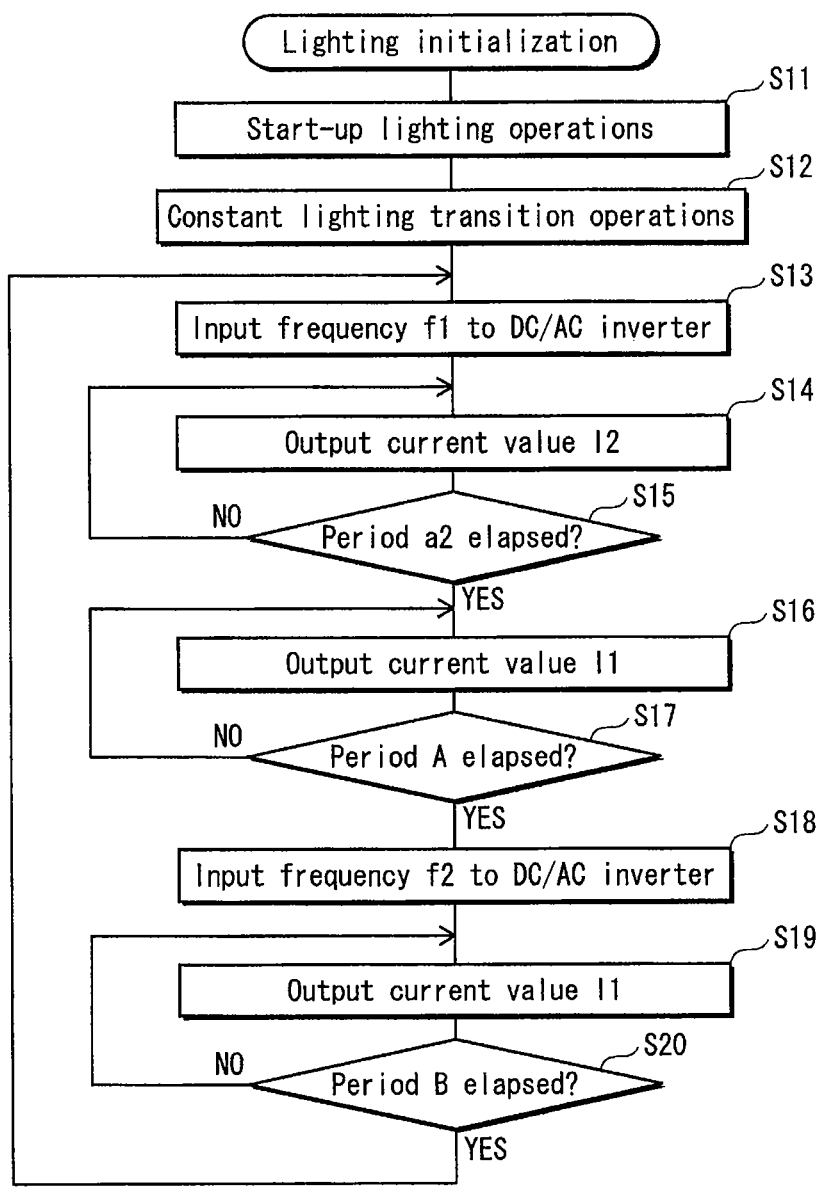
FIG. 6 is a flowchart explaining the operations of a lighting device.

As described in FIG. 6, the operations of the lighting device 3 include start-up lighting operations (S11), constant lighting transition operations (S12), and constant lighting operations (S13 through S20). Among these, the start-up lighting operations (S11) and the constant lighting transition operations S12 do not differ from conventional technology, and are thus simplified below. Here, the term "constant lighting" refers to lighting where constant power is supplied to the high-pressure mercury lamp 4 and the gas pressure inside the high-pressure mercury lamp 4 is kept stable according to that power.

(Start-Up Lighting Operations)

Once a (non-diagrammed) lighting switch is switched ON to cause the high-pressure mercury lamp 4 to initialize discharge, the microcomputer 11 begins start-up lighting operations (S11). During start-up lighting operations, the high-voltage generator 7 generates high-frequency high-voltage power at, for example, 3 kV and 100 kHz. Once the high-frequency high-voltage power is applied to the high-pressure mercury lamp 4, the insulation between the electrodes is broken and discharge begins. In order to stabilize this discharge, a warm-up period of, for example, 2 seconds is provided, during which fixed current control is performed with a selected high-frequency current within a range of 1 kHz to 500 kHz. The start-up lighting operations are complete when the warm-up period has elapsed.

During the above-described start-up operations, the output from the high-voltage generator causing the high-pressure mercury lamp 4 to begin discharge is not limited to high-frequency high-voltage power, but may instead take the form of a high-voltage pulse as produced by a commonly-known blocking oscillator. In addition, the method by which the arc discharge is stabilized after initialization is not limited to these high-frequency operations, but may instead involve using commonly-known DC operations, or using constant current control operations with low-frequency current at less than 1 kHz.

(Constant Lighting Transfer Operations)

After the start-up lighting operations (S11), the microcomputer 11 performs constant lighting transition operations (S12). At this point, fixed current control (at perhaps 5.5 A) is performed on current in a substantially square wave at a predetermined frequency (such as 135 Hz). Next, the lamp voltage increases as the mercury evaporates. Upon reaching a predetermined voltage (such as 65 V), the constant power control (at 360 W) switches to another current in a substantially square wave at the same predetermined frequency. This constant power control lasts until a predetermined period (such as 100 s) has passed. The predetermined period (here, 100 s) may be set to have any appropriate duration for the lamp in question, as long as the period suffices for stabilizing the gas pressure within the lamp and transferring to constant lighting operations.

(Constant Lighting Operations)

After the constant lighting transition operations (S12), the microcomputer 11 begins operations that switch the frequency and the magnitude so as to produce the AC current waveform shown in FIG. 5.

The microcomputer 11 has a (non-diagrammed) counter that measures time based on the internal clock of the microcomputer 11. Also, the microcomputer 11 registers frequency f1, frequency f2, the ratio r of current value I1 to current value I2 (here, r=1.5), the duration of period A, the duration of period a2 within period A, the duration of period B, and the power rating P of the high-pressure mercury lamp 4 (here, P=360 W).

After the constant lighting transition operations, the microcomputer 11 receives the signals output by the lamp current detector 8 and the lamp voltage detector 9, constantly calculates the average current needed to maintain the high-pressure mercury lamp 4 at the power rating P, and controls the DC/DC converter 5 by having a current control signal sent from the PWM control circuit 12 to the DC/DC converter 5.

First, the microcomputer 11 outputs frequency f1 as a frequency control signal to the DC/AC inverter 6, in order to perform lighting operations for period A (S13). As a result, the frequency of the lamp current is set to frequency f1. The microcomputer 11 controls the DC/DC converter 5 via the PWM control circuit 12 so that the lamp current is set to current value I2, thus causing current at current value I2 to be output (S14).

Until period a2 elapses (No in S15), the microcomputer 11 repeats S14 such that the lamp current is set to current value I2.

Once period a2 has elapsed (Yes in S15), the lamp current is switched from current value I2 to current value I1 (S16). The microcomputer 11 controls the DC/DC converter 5 via the PWM control circuit 12 so that the lamp current is set to current value I1, thus causing current at current value I1 to be output. Given that frequency f1 input during S15 is maintained, the frequency of the lamp current in the DC/AC inverter 6 remains frequency f1.

Until period A elapses (No in S17), the microcomputer 11 repeats S16 such that the lamp current is set to current value I1.

Once period A has elapsed (Yes in S17), the microcomputer 11 inputs frequency f2 as a frequency control signal to the DC/AC inverter 6 in order to perform lighting operations for period B (S18). As a result, the frequency of the lamp current is set to frequency f2. The microcomputer 11 controls the DC/DC converter 5 via the PWM control circuit 12 so that the lamp current is set to current value I1, thus causing current at current value I1 to be output (S19).

Until period B elapses (No in S20), the microcomputer 11 repeats S19 such that the lamp current is set to current value I1.

Once period B has elapsed (YES in S19), the process returns to S13. The steps S13 through S20 are repeated until the lighting switch is switched OFF.

(Setting Ranges for Frequency, Current Magnitude)

The values of frequency f1 and f2, the durations of period A and B, the ratio r of current value I1 to current value I2, and the duration of period a2 during which current value I2 is supplied are set as follows.

Frequency f1 is set within a range of 20 Hz to 200 Hz, and the duration of period A is set within a range of 0.5 cycles to 5 cycles.

Frequency f2 is set within a range of 300 Hz to 1000 Hz, and the duration of period B is set within a range 1 cycles to 200 cycles.

The ratio r is a value greater than 1 and less than or equal to 2. Ideally, the ratio r is a value greater than or equal to 1.1 and less than or equal to 1.6.

The period a2 is provided in each iteration of period A. The duration of period a2 is less than one half-cycle of frequency f1, and is preferably no more than one quarter-cycle of frequency f1.

(Effects of Periods A and B)

By repeatedly alternating between frequency f1 for period A and frequency f2 for period B, set as indicated above, and thus providing AC current to the high-pressure mercury lamp 4, the effect on the protrusions 23 of the electrodes 19 is growth during period A and reduction during period B.

The reasons are as follows.

When the high-pressure mercury lamp 4 is lit by AC current, whichever of the electrodes 19 is in the anode phase undergoes an increase in temperature due to electrons colliding primarily with the tip portion 22 and the protrusion 23 thereof, resulting in tungsten evaporation. The tungsten evaporated from the anode-phase electrode 19 chemically combines with the halogens in the arc tube 15, becoming halogenated tungsten and being carried by convection within the arc tube 15. The halogenated tungsten disassociates in high-temperature regions, such as areas near the arc plasma or the electrode tips. Tungsten ions, which are cations, are pulled toward a region where the magnetic field is concentrated, centered on the protrusion 23 of the electrode 19 in the cathode phase, and come to accumulate there. Each of the electrodes 19 changes from being in the anode phase to being in the cathode phase, or vice-versa, every time the AC current undergoes polarity reversal. Therefore, the electrodes 19 undergo tungsten evaporation and accumulation in alternation.

For the AC current at frequency f1, in which a long time passes between polarity reversals of the anode phase and the cathode phase, more tungsten ions are pulled toward and accumulate on the protrusion 23 of the cathode-phase electrode. This produces a wider protrusion, resulting in the growth of the protrusion 23. However, for the AC current at frequency f2, in which a shorter time passes between polarity reversals in comparison to frequency f1, the electrode in the cathode phase changes to the anode phase before enough tungsten ions are pulled to the protrusion 23 and come to accumulate there. This leads to less accumulation, forming a narrower protrusion and resulting in reduction of the protrusion 23.

Figure 7A:
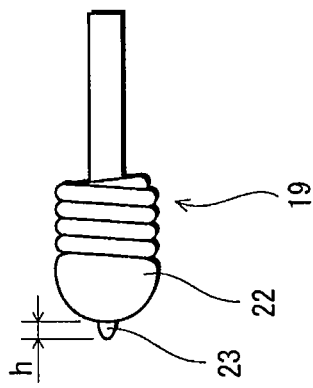
FIGS. 7A and 7B are schematic diagrams describing the state of a protrusion on the electrodes.
Figure 7B:
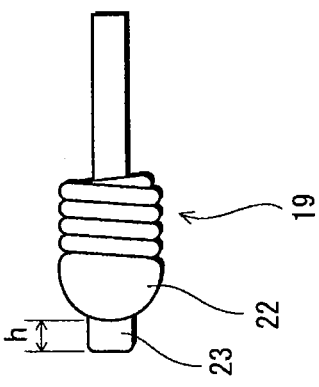

FIG. 7A illustrates a protrusion having undergone continuous lighting at frequency f1 with the AC current provided by the high-pressure mercury lamp 4. As shown, the protrusion 23 of the electrode 19 has widened and the height h thereof has increased due to the growth effect produced by frequency f1. In contrast, FIG. 7B illustrates a protrusion having undergone continuous lighting at frequency f2. As shown, the protrusion 23 has narrowed and the height h thereof has decreased due to the reduction effect of frequency f2.

Given the above, the growth and reduction effects can be combined and applied to the protrusions in combination, by repeatedly alternating between frequency f1 for period A and frequency f2 for period B. Therefore, the protrusions 23 are appropriately shaped, and that shape is maintained. The shape of the protrusions 23 shown in FIG. 3 is as obtained by repeatedly alternating between period A and period B.

(Effects of Current Value I2)

Period A and period B alternate as described above. As shown in FIG. 5, during the low-frequency period A at frequency f1, the current magnitude is current value I1 for period a1 and is current value I2 for the remaining period a2, current value I2 being of greater magnitude than current value I1. Given such conditions, the protrusions 23 of the electrodes 19 grow appropriately, being maintained without loss. The tungsten accumulation effect is also imparted to the tip portions 22 that serve as the base for the protrusions 23. Accordingly, deterioration of the tip portions 22 is suppressed. As a result, expansion of the inter-electrode distance D is also suppressed.

Figure 8A:
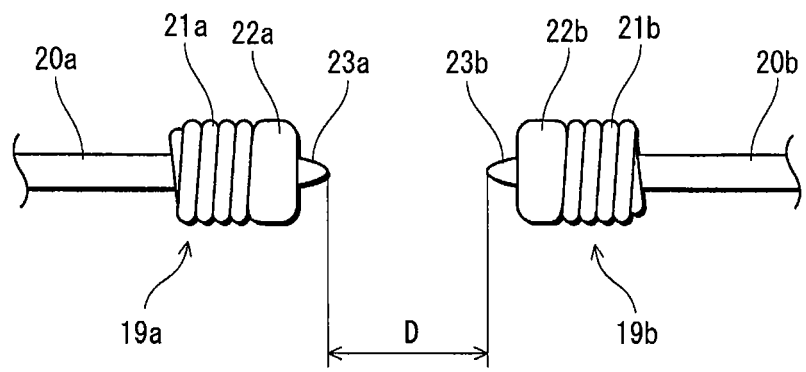
FIGS. 8A and 8B are schematic diagrams describing the state of a tip portion on the electrodes.
Figure 8B:
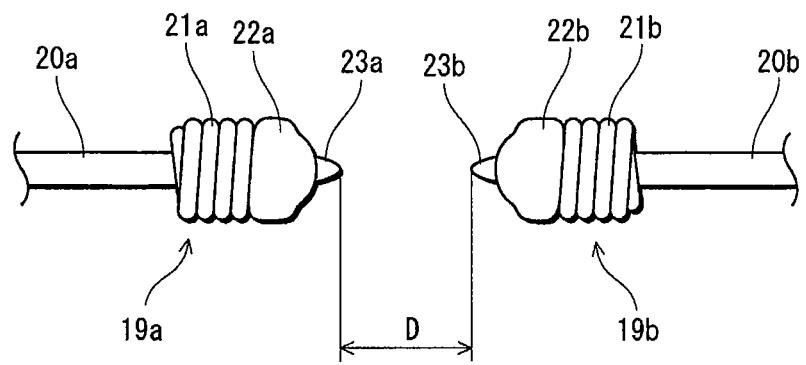

FIG. 8A is a schematic diagram illustrating the tip portions 22 of the electrodes 19 having undergone deterioration. FIG. 8B is a schematic diagram illustrating the tip portions 22 of the electrodes 19 where deterioration has been suppressed through tungsten accumulation with the above-described current value I2.

Figure 9A:
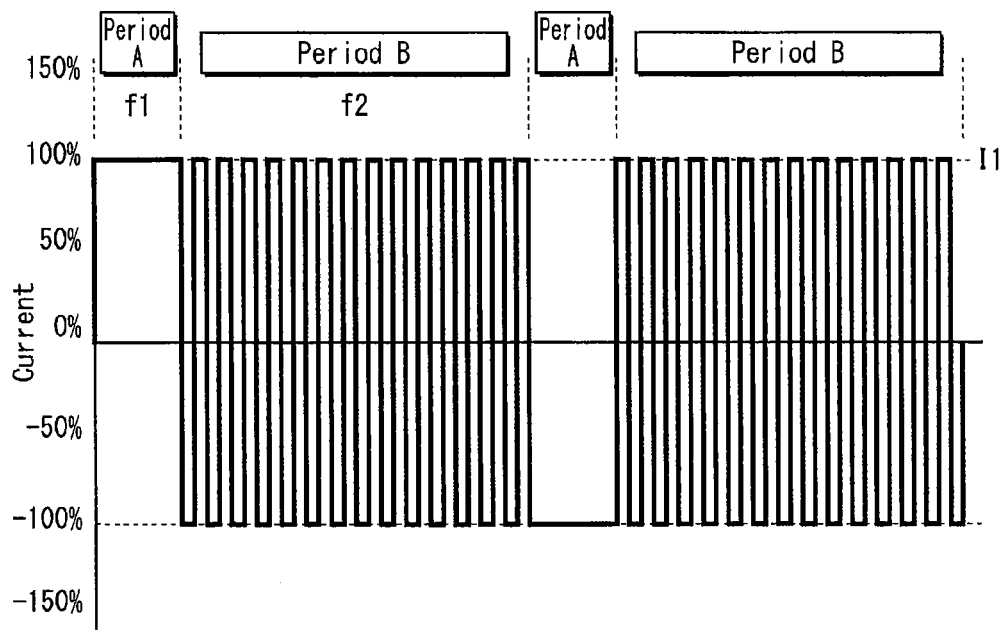
FIGS. 9A and 9B are diagrams showing conventional AC current waveforms used as comparative examples in a lighting test.

Let the AC current supplied to the high-pressure mercury lamp 4 be in the conventional waveform shown in FIG. 9A, such that frequency f1 for period A and frequency f2 for period B alternate but the current magnitude is set to current value I1 for period A as well as period B. In such circumstances, as shown in FIG. 8A, as the aggregate lighting time of the lamp grows, the tip portions 22a and 22b gradually deteriorate, going from substantially hemispherical to substantially conical. Thus, the inter-electrode distance D gradually expands, despite the protrusions 23a and 23b being appropriately shaped and maintained.

Alternatively, let the current magnitude be current value I1 for period a1 within period A and be current value I2 for the remaining period a2. In such circumstances, as shown in FIG. 8B, deterioration is better suppressed in the tip portions 22a and 22b relative to the tip portions 22a and 22b shown in FIG. 8A. The reasons are believed to be as follows.

When current is supplied at current value I2, which is greater in magnitude than current value I1, the temperature of the electrode 19 in the anode phase increases along with the heightened current value. Thus, the temperature of the tip portion 22 increases along with that of the protrusion 23, reaching a temperature that facilitates disassociation of the halogenated tungsten. This increases the amount of tungsten ions present in the vicinity of the tip portion 22. As a result, after changeover to the cathode phase, accumulation is promoted not only in the protrusion 23 but also in the tip portion 22. Thus, as shown in FIG. 8B, deterioration of the tip portion 22 is suppressed. Accordingly, expansion of the inter-electrode distance D is, in turn, suppressed.

If the temperature of the protrusion 23 and the tip portion 22 increases too much, then despite the facilitated disassociation of the halogenated tungsten, the amount of evaporated tungsten far surpasses the amount accumulated. This may cause net deterioration of the protrusion 23 and the tip portion 22. Therefore, the time during which current is supplied at current value I2 should be set with the temperature increase of the protrusion 23 and the tip portion 22 taken into consideration.

(Reasoning for Setting Ranges)

The following describes the reasoning for which the values of frequency f1 and f2, the duration of periods A and B, the ratio r of current value I1 to current value I2, and the duration of period a2 during which current at current value I2 is supplied are set within the above-described ranges.

When the frequency f1 of the AC current supplied to the high-pressure mercury lamp 4 is less than 20 Hz, the anode phase for each of the electrodes 19 is overly long. This long anodic heating time may cause the temperature of the protrusion 23 of the electrode 19 to rise more than necessary, thus diminishing the growth effect and potentially causing deformation or evaporative reduction of the protrusion 23. On the other hand, when the frequency is greater than 200 Hz, the cathode phase for each of the electrodes 19 is overly short. This may lead to decreased tungsten accumulation in the protrusion 23 of the electrode 19, in turn potentially diminishing the growth effect and causing deformation or reduction of the protrusion 23.

Also, if the duration of period A is greater than five cycles, then despite frequency f1 being within a range of 20 Hz to 200 Hz, the protrusion growth time may be overly long, potentially leading to flickering problems should the protrusion diameter grow enough to flatten. On the other hand, if the duration of period A is less than one half-cycle, then the protrusion growth time may be overly short, potentially leading to deformation or reduction of the protrusion 23 should the diameter narrow. Accordingly, in order to enhance growth in the protrusion 23, frequency f1 should be within a range of 20 Hz to 200 Hz, and the length of period A should be within a range of 0.5 cycles to 5 cycles.

When frequency f2 is greater than 1000 Hz, the electrode 19 in the cathode phase changes to the anode phase before enough tungsten ions are pulled to the protrusion 23 and come to accumulate there. The effect of the tungsten returning to the protrusion 23 of the electrode 19 is thus weakened while narrowing of the protrusion 23 is accelerated, and tungsten comes to accumulate in areas other than the tip portion 22 of the electrode 19. As such, the overall shape of the tip portion 22 may become distorted or reduced. On the other hand, when frequency f2 is less than 300 Hz, the anode phase for each of the electrodes 19 is overly long, causing more tungsten ions to accumulate on the protrusion 23. Thus, the protrusion 23 of the electrode 19 cannot be narrowed, the growth of the protrusion 23 becomes excessive, and the inter-electrode distance may be overly reduced.

Also, if the length of period B is greater than 200 cycles, then despite frequency f2 being within a range of 300 Hz to 1000 Hz, the protrusion reduction time may be overly long, causing advanced narrowing and potentially leading to deformation or reduction of the protrusion 23. If the length of period B is less than one cycle, then the protrusion reduction time may be too brief, causing advanced widening and potentially leading to flickering problems should the tip of the protrusion 23 flatten. Accordingly, in order to narrow the protrusions 23 and cause appropriate reduction thereof, frequency f2 is set within a range of 300 Hz to 1000 Hz while the length of period B is within a range of 1 cycles to 200 cycles.

If current value I2 is of greater magnitude than current value I1, then current value I2 imparts a greater tungsten accumulation effect to the protrusion 23 and the tip portion 22 of the electrode 19 relative to current value I1. Further, if current value I2 is greater than twice current value I1, then the protrusion 23 and the tip portion 22 may overheat. This causes the amount of evaporated tungsten to greatly exceed the amount of accumulated tungsten, potentially leading to reduction of the protrusion 23 and the tip portion 22. Therefore, the ideal ratio r of the current value I1 to the current value I2 is greater than one but less than or equal to two. Also, if current value I2 is less than 1.1 times current value I1, then the temperature of the tip portion 22 is insufficiently raised, leading to a decreased tungsten accumulation effect in the tip portion 22. On the other hand, if current value I2 is more than 1.6 times current value I1, then lamp flickering may become perceptible given the remarkable change in brightness that occurs when changing from current value I1 to current value I2. Therefore, the ideal ratio r is greater than or equal to 1.1 but smaller than or equal to 1.6.

If the duration of period a2 is an entire half-cycle of frequency f1, then the protrusion 23 and the tip portion 22 of the electrode 19 may overheat, causing an overabundance of tungsten to evaporate and potentially leading to reduction of the protrusion 23 and the tip portion 22. Therefore, the duration of period a2 is ideally less than one half-cycle of frequency f1. Also, when frequency f1 is within a range of 20 Hz to 200 Hz and period A is within a range of 0.5 cycles to 5 cycles, the accumulation of tungsten on the tip portion 22 of the electrodes 19 is effectively promoted by setting the duration of period a2 at one quarter-cycle or less of frequency f1.

The AC current waveform shown in FIG. 5 has the following settings: frequency f1 is 46 Hz, frequency f2 is seven times frequency f1 or 322 Hz, the duration of period A is 0.5 cycles, the duration of period B is 14 cycles, the ratio r is 1.5, and the duration of period a2 is one-seventh of a half-cycle of frequency f1 (equal to one half-cycle of frequency f2).

Furthermore, as period A and period B alternate in the AC current waveform shown in FIG. 5, the AC current phase at the beginning of each period A is the opposite of the previous, reversing for each successive period A. As such, the frequency at which the electrodes 19a and 19b enter the anode phase and the cathode phase is balanced. This enables a well-balanced tungsten accumulation effect in the protrusions 23 and the tip portions 22 of the pair of electrodes.

(Lighting Test Results)

Next, the results of a lighting test, performed in order to verify the effects of the AC current waveform from FIG. 5, are described.

Figure 9B:
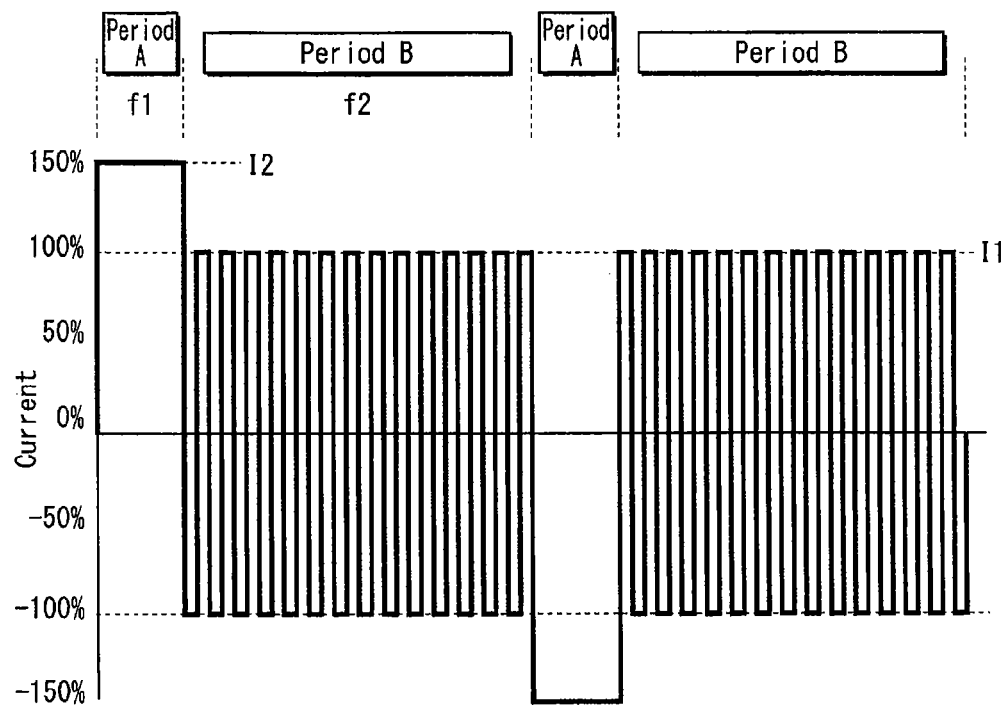

This lighting test involves working example 1 and comparative examples 1 and 2. Working example 1 is a lamp to which the AC current waveform from FIG. 5 is supplied. Comparative example 1 is a lamp to which a conventional waveform, namely the AC current waveform shown in FIG. 9A, is supplied. Comparative example 2 is a lamp to which the AC current waveform shown in FIG. 9B is supplied. A high-pressure mercury lamp 4 having a power rating of 360 W is used for all lighting tests.

The AC current waveforms used in working example 1 and in comparative examples 1 and 2 are similar in that each waveform alternates between frequency f1 for period A and frequency f2 for period B. However, the AC current waveform used in working example 1 has a magnitude of current value I2 for period a2 within period A and a magnitude of current value I1 for the remainder, period a1. In contrast, the AC current waveform used in comparative example 1 has a magnitude of current value I1 for the entirety of period A. Similarly, the AC current waveform used in comparative example 2 has a magnitude of current value I2 for the entirety of period A.

The present lighting test consists of supplying the AC current waveforms of working example 1 and of comparative examples 1 and 2 to the high-pressure mercury lamps 4 in order to determine the luminance maintenance factor and the inter-electrode distance increase factor for each lamp.

Specifically, at lighting initialization time (lighting time 0 h), the luminance and the inter-electrode distance of each high-pressure mercury lamp 4 are set to a reference point (of 100%). The luminance maintenance factor and the inter-electrode distance increase factor are then measured at predetermined periods as lighting time elapses. The luminance maintenance factor is calculated with reference to the ANSI lumen, as defined by the American National Standards Institute (ANSI). A luminance maintenance factor of 50% is considered the baseline for lamp life.

Figure 11A:
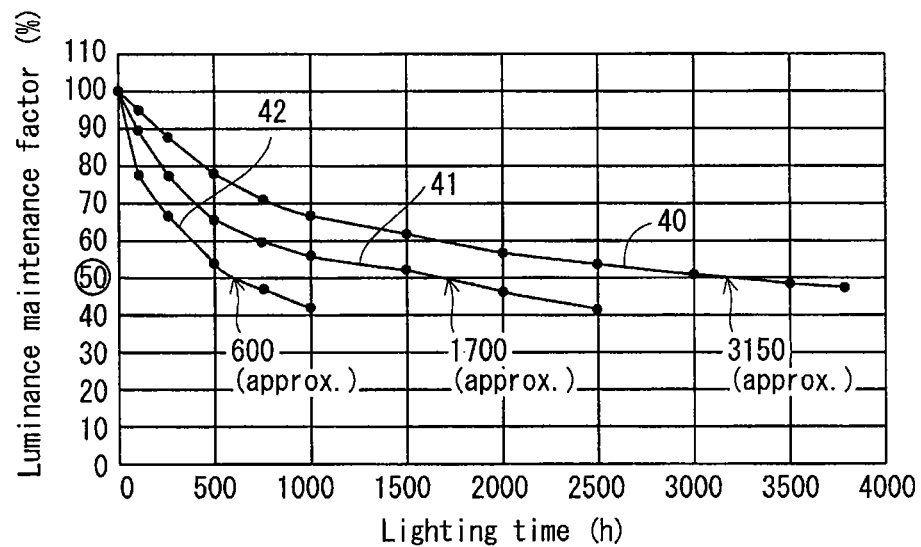
Figure 11B:
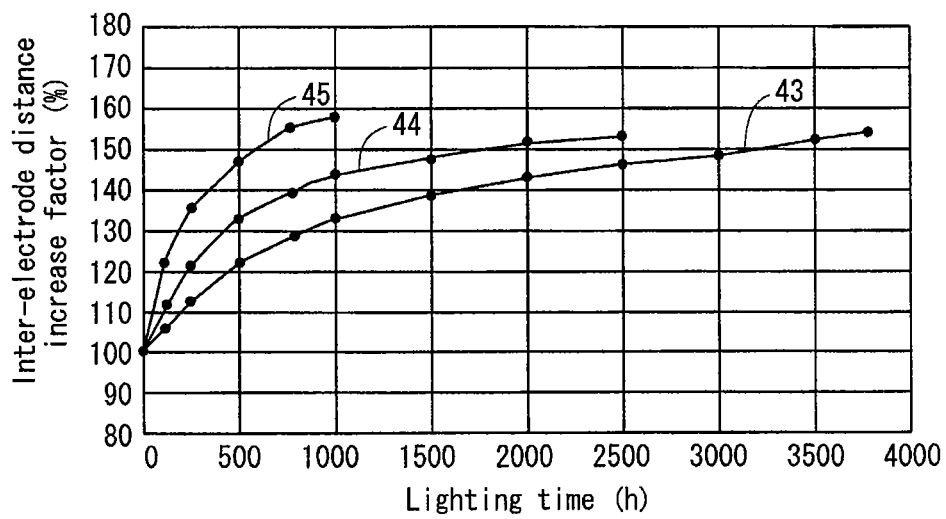
FIG. 11B is a graph similarly explaining the relationship of lighting time to the inter-electrode distance.

FIG. 10 is a table showing the change in the luminance maintenance factor and in the inter-electrode distance increase factor over time during the lighting test. FIG. 11A is a plotted diagram of the luminance maintenance factors from FIG. 10, with the luminance maintenance factors on the vertical axis and the elapsed lighting time on the horizontal axis. FIG. 11B is a plotted diagram of the inter-electrode distance increase factors from FIG. 10, with the inter-electrode distance increase factors on the vertical axis and the elapsed lighting time on the horizontal axis.

Also, in FIG. 11A, line 40 indicates the change in working example 1, as do line 41 for comparative example 1 and line 42 for comparative example 2. In FIG. 11B, line 43 indicates the change in working example 1, as do line 44 for comparative example 1 and line 45 for comparative example 2.

As shown in FIGS. 10, 11A, and 11B, the luminance maintenance factor and the inter-electrode distance increase factor for working example 1 change slowly and gently over the lighting time, in comparison to comparative example 1 and comparative example 2.

Turning to lamp life, as shown in FIG. 11A, given the point where line 40 of working example 1 crosses the 50% luminance maintenance factor mark, the lamp life of working example 1 is deemed to be approximately 3150 h. Similarly, the lamp life of comparative example 1 is approximately 1700 h, and that of comparative example 2 is approximately 600 h.

As such, the lamp life of working example 1 is nearly twice that of comparative example 1, which uses a conventional waveform. This enables the realization of greater lamp life. Turning to the inter-electrode distance increase factor with particular attention to the first 1000 h after illumination initialization, as shown in FIGS. 10 and 11B, growth of the inter-electrode distance increase factor for working example 1 is suppressed in comparison to comparative example 1. At 1000 h since initialization, the inter-electrode distance increase factor is 133% for working example 1. In contrast, that of comparative example 1 is 144%, or 11% higher. A likely explanation is that, in working example 1, current is supplied at current value I2 for period a2 within period A, which imparts the tungsten accumulation effect to the tip portions 22a and 22b of the electrodes 19a and 19b, thus suppressing deterioration therein. Accordingly, expansion of the inter-electrode distance D is suppressed, in turn suppressing lamp luminance decreases.

In contrast, the lamp life of comparative example 2 is 600 h, which is shorter than both working example 1 and comparative example 1. This is likely due to the considerable growth of the inter-electrode distance increase factor, which accelerates lamp luminance decreases. The inter-electrode distance increase factor for comparative example 2 is 147% when only 500 h have elapsed since initialization. A likely explanation is that, in comparative example 2, current is supplied at current value I2 for the entire duration of period A. This causes overheating in the protrusions 23 and the tip portions 22 of the electrodes 19, which causes a greater amount of tungsten to evaporate and leads to advanced reduction of the protrusions 23 and the tip portion 22.

Embodiment 2

Figure 12:
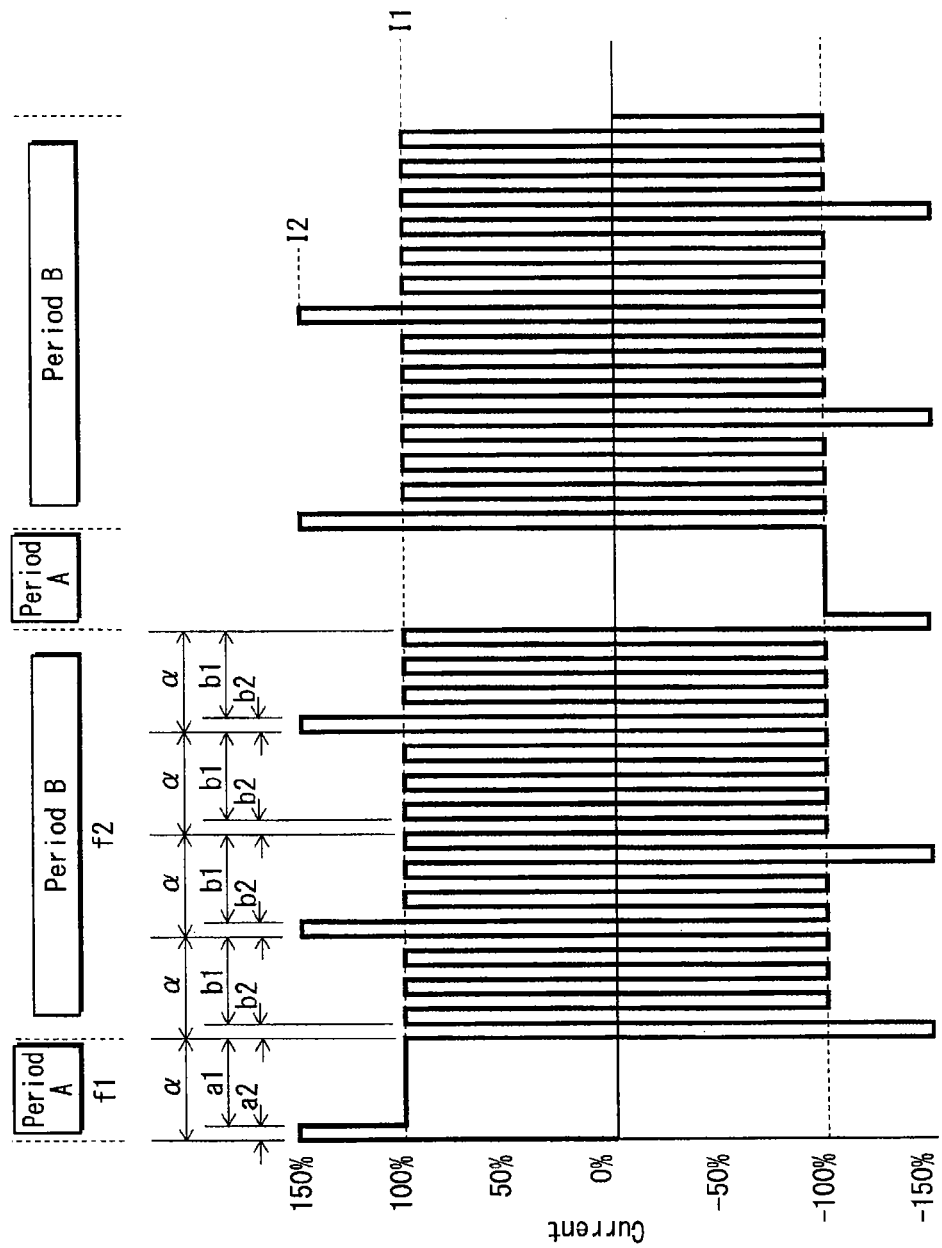
FIG. 12 is a diagram illustrating a sample AC current waveform as output by the lighting device pertaining to Embodiment 2 of the present invention.

FIG. 12 is a waveform diagram illustrating an example of AC current as output by the lighting device 3, pertaining to Embodiment 2.

The AC current waveform shown in FIG. 12 is made up by alternating between frequency f1 for period A and frequency f2 for period B. Within period A, the magnitude of the current alternates between current value I2 and current value I1. This is the point of commonality with the AC current waveform from FIG. 5. However, in contrast to the AC current waveform from FIG. 5, in which current is supplied at a magnitude of current value I1 for the entirety of period B, the magnitude of the AC current waveform of FIG. 12 alternates between current value I2 and current value I1 during period B.

Given that the AC current settings are similar to those of the waveform from FIG. 5, explanations thereof are simplified or omitted for convenience. The AC current waveform from FIG. 12 is obtained by modifying the program of the microcomputer 11 in the lighting device 3 from FIG. 1 so as to control the chronological settings for changing between current value I1 and current value I2. Accordingly, the structure of the lighting device 3 and of the high-pressure mercury lamp 4 is identical to that shown in FIGS. 1 though 4. For simplicity, the same reference numbers are used but the descriptions are omitted.

Let one half-cycle of frequency f2 serve as a unit. Within period B, the AC current waveform from FIG. 12 alternates between period b2, in which the magnitude of the current is current value I2, for one unit, and period b1, in which the magnitude of the current is current value I1, for six units. The duration of period A is seven units. Period A includes period a2, in which current value I2 is applied for one unit, followed by period a1, in which current value I1 is applied for the remaining six units. Accordingly, period a2 and period b2 are of the same length, as are period a1 and period b1. Furthermore, the repetition interval a between periods in which current value I2 is supplied is as long as the sum of period a1 (or period b1) and period a2 (or period b2), and is thus equal to seven units.

In the present Embodiment, the repetition interval α is approximately 11 ms, given that frequency f2 is 322 Hz. The repetition interval α is a regular interval of no more than 20 ms. Thus, despite intermittent changes in lamp luminance as the magnitude of the current changes from current value I1 to current value I2, any flickering is hard for human eyes to detect. Accordingly, supplying the AC current waveform from FIG. 12 to the high-pressure mercury lamp 4 is more practical than the AC current waveform from FIG. 5 in that flickering is not noticeable in the former. If the repetition interval α is less than 1 ms, then the occurrence frequency of current value I2 becomes excessive, leading to excessively high temperatures in the electrodes 19. This may cause a decrease of the tungsten accumulation effect in the protrusions 23 and the tip portions 22 of the electrode 19. Therefore, the ideal repetition interval α is greater than or equal to 1 ms but less than or equal to 20 ms.

Also, with the AC current waveform shown in FIG. 12, the polarity of the current at current value I2 is controlled so as to alternate between positive and negative over period A and period B. Thus, the tungsten accumulation effect imparted to the tip portions 22a and 22b is balanced.

In the present Embodiment, the magnitude of the current alternates between current value I2 and current value I1 during period B. In such circumstances, supplying both positive and negative current at current value I2 during each iteration of period B leads to a desirable balanced anodic heating effect. In consideration of this point, and of the point that current value I2 is supplied for a portion of period B one half-cycle in length, then the ideal duration of period B is within a range of 2 cycles to 200 cycles, inclusive.

(Lighting Device Operations)

An example of the operations of the lighting device 3 pertaining to Embodiment 2 is described below, with reference to the flowchart shown in FIG. 13.

Figure 13:
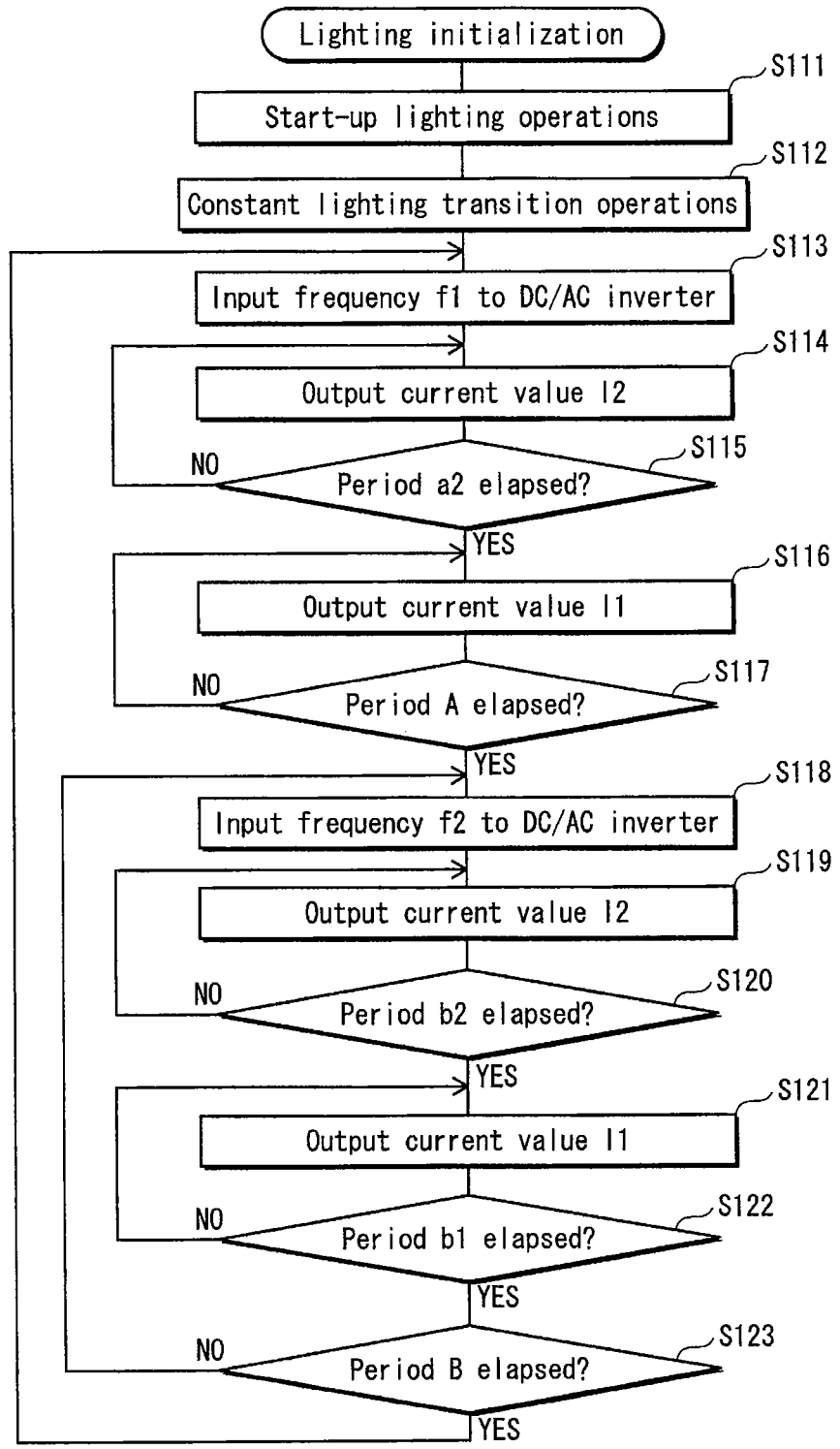
FIG. 13 is a flowchart explaining the operations of the lighting device.

As shown in FIG. 13, the operations of the lighting device 3 pertaining to Embodiment 2 are similar to those of the lighting device 3 pertaining to Embodiment 1 (S13 through S20 from FIG. 6) in that they include controlling the output of current value I1 and of current value I2 during period A (S114 through S117) and repeatedly alternating between frequency f1 for period A and frequency f2 for period B (S113 and S118). However, unlike the operations of lighting device 3 pertaining to Embodiment 1, which do not include output control of current value I2 during period B, the operations of the lighting device 3 pertaining to Embodiment 2 do include output control of current value I2 during period B (S119 and S120). The operations identical to those of FIG. 6 are omitted for simplicity.

In the present Embodiment, the microcomputer 11 registers, as additional parameters, the duration of period b2 within period B.

The following explanations begin after the constant lighting transfer operation (S112).

Much like in Embodiment 1, after the constant lighting transition operations, the microcomputer 11 receives the signals output by the lamp current detector 8 and the lamp voltage detector 9, ordinarily calculates the average current needed to maintain the high-pressure mercury lamp 4 at the power rating P, and controls the DC/DC converter 5 by having a current control signal sent from the PWM control circuit 12 to the DC/DC converter 5.

First, the microcomputer 11 performs lighting operations for period A. Given that S113 through S117 are identical to S13 through S17 from FIG. 6, explanations thereof are omitted.

Once period A has elapsed (Yes in S117), the microcomputer 11 inputs frequency f2 as a frequency control signal to the DC/AC inverter 6, in order to perform lighting operations for period B (S118). As a result, the frequency of the lamp current is set to frequency f2. The microcomputer 11 controls the DC/DC converter 5 via the PWM control circuit 12 so that the lamp current is set to current value I2, thus causing current at current value I2 to be output (S119).

Until period b2 has elapsed (No in S120), the microcomputer 11 repeats S119 so that the lamp current remains at current value I2.

Once period b2 has elapsed (Yes in S120), the lamp current is switched from current value I2 to current value I1 (S121). Given that frequency f2 input is maintained during S118, the frequency of the lamp current in the DC/AC inverter 6 is frequency f2.

Until period b1 has elapsed (No in S122), the microcomputer 11 repeats S121 so that the lamp current remains at current value I1.

Once period b1 has elapsed (Yes in S122), the microcomputer 11 verifies whether or not period B has elapsed (S123). If period B has not elapsed (No in S123), then the process returns to S118 and the set of S118 through S123 is repeated.

If period B has elapsed (Yes in S123), then the process returns to S113. The steps of S113 through S123 are repeated until the lighting switched is switched OFF.

(Lighting Test Results)

Next, the results of a lighting test performed in order to verify the effects of the AC current waveform shown in FIG. 12 are described.

The present lighting test consists of supplying the AC current waveform from FIG. 12, serving as working example 2, to the high-pressure mercury lamp 4 having a power rating of 360 W in order to determine the luminance maintenance factor and the inter-electrode distance increase factor for the lamp.

Figure 15A:
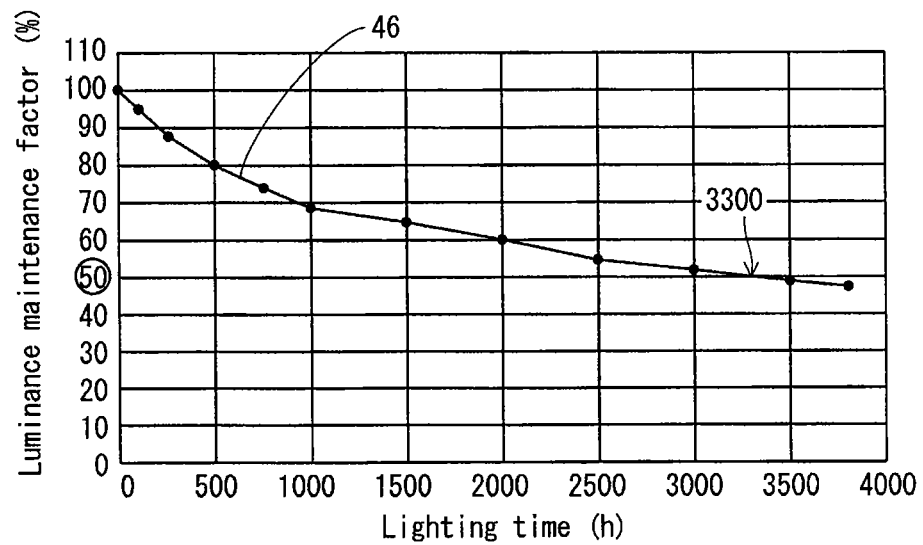
Figure 15B:
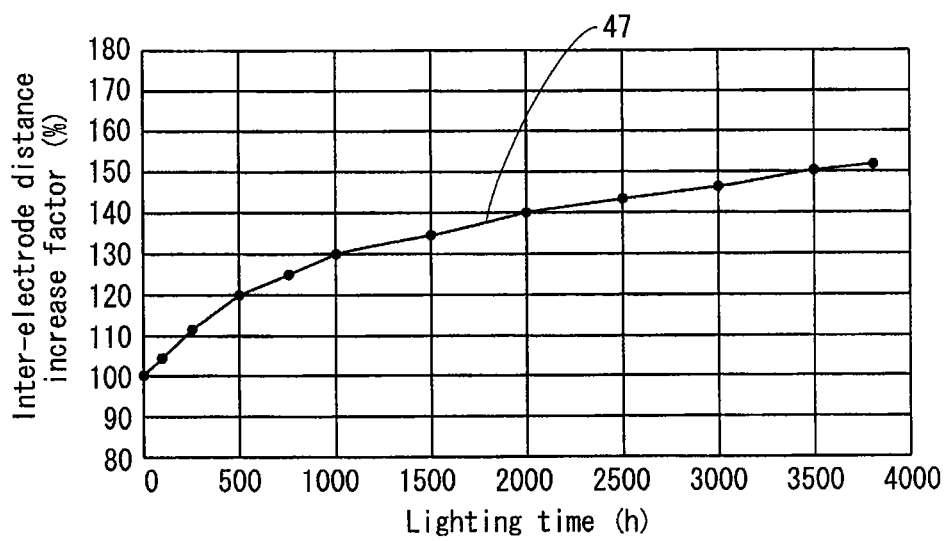
FIG. 15B is a graph similarly explaining the relationship of lighting time to the inter-electrode distance.

FIG. 14 is a table showing the change in the luminance maintenance factor and in the inter-electrode distance increase factor over time during the lighting test. FIG. 15A is a plotted diagram showing the luminance maintenance factors from FIG. 14. FIG. 15B is a plotted diagram showing the inter-electrode distance increase factors from FIG. 14.

In FIG. 15A, line 46 indicates the changes in working example 2, as does line 47 in FIG. 15B.

As shown in FIG. 15A, line 46 of working example 2 changes slowly and gently after lighting initialization time, much like line 40 of working example 1. As shown in FIG. 15B, line 47 of working example 2 changes slowly and gently after lighting initialization time, much like line 43 of working example 1.

Turning to lamp life, as shown in FIG. 15A, given the point where line 46 crosses the 50% luminance maintenance factor mark, the lamp life of working example 2 is deemed to be approximately 3300 h.

Also, turning to the inter-electrode distance increase factor, as shown in FIGS. 14 and 15B, at 1500 h after lighting initialization, growth of the inter-electrode distance increase factor for working example 2 is suppressed, much like in working example 1. As such, although current value I2 is alternately supplied during period A and period B, the tungsten accumulation effect is imparted to the tip portions 22a and 22b of the electrodes 19a and 19b, while deterioration is suppressed therein.

Embodiment 3

Figure 16:
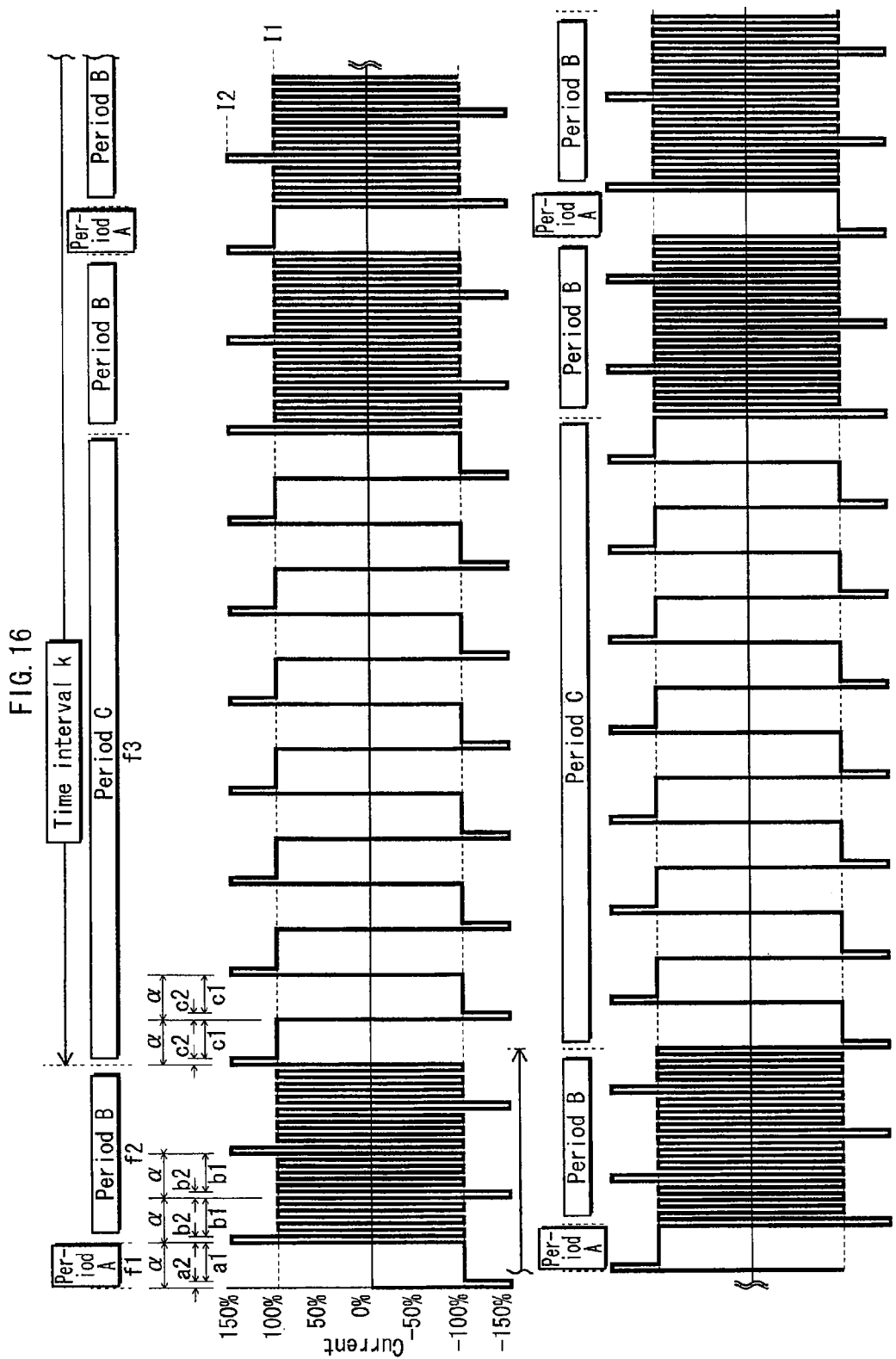
FIG. 16 is a diagram illustrating a sample AC current waveform as output by the lighting device pertaining to Embodiment 3 of the present invention.

FIG. 16 is a waveform diagram illustrating an example of AC current as output by the lighting device 3 pertaining to Embodiment 3.

The AC current waveform shown in FIG. 16 is made up by repeatedly alternating between frequency f1 for period A and frequency f2 for period B. Also, much like the AC current waveform from FIG. 12, the magnitude of the current alternates between current value I2 and current value I1 within both period A and period B. The AC current waveform from FIG. 12 is made up only of repetitions of period A and period B. In contrast, the AC current waveform from FIG. 16 repeats period A, period B, and frequency f3 (a third frequency) lower than or equal to frequency f1, for period C at interval k of predetermined length. Period A and period B alternate over interval k. The duration of period C is longer than that of period A.

Given that the AC current settings are similar to those of the AC current waveform from FIG. 12, explanations thereof are simplified or omitted for convenience. Also, the AC current waveform from FIG. 16 is obtained by modifying the program of the microcomputer 11 in the lighting device 3 from FIG. 1. Accordingly, the structure of the lighting device 3 and of the high-pressure mercury lamp 4 is identical to that shown in FIGS. 1 though 4. For simplicity, the same reference numbers are used but the description is omitted.

In the AC waveform from FIG. 16, frequency 13 is identical to frequency f1 at 46 Hz, and the duration of period C is seven cycles of AC current at frequency f3. Further, taking one half-cycle of frequency f2 as a unit, the length of one half-cycle of frequency f3 is seven units. For each half-cycle of frequency 3 during period C, current is supplied at current value I2 for period c2 and at current value I1 for the remainder, period c1.

Period c2 lasts from the beginning of each half-period of frequency 13 until the equivalent of one half-cycle of frequency 2, i.e., one unit, has passed. Period c1 lasts from the end of period c2 until the end of the ongoing half-cycle, and is thus six units long. Accordingly, period c2 is of the same duration as period a2 and period b2, while period c1 is of the same duration as period a1 and period b1. Furthermore, the repetition interval a between periods in which current value I2 is supplied is seven units in duration.

Also, between one period C (top row of FIG. 16) and the next period C (bottom row of FIG. 16), period A and period B alternate for a number of repetitions. Each period C is preceded and followed by an iteration of period B.

In the present Embodiment, during period C, AC current at frequency which is lower than or equal to frequency f1, is supplied for a longer duration than period A in which frequency f1 is supplied. As such, the anodic heating time in each anode phase for one of the electrodes 19 is at least as long as period A and is repeated more frequently than period A, thus suppressing the growth effect on the protrusion 23. By repeating period C at a predetermined interval, the growth effect on the protrusion 23 is intermittently suppressed.

Period C is so set for the following reasons.

Due to variability in individual characteristics among high-pressure discharge lamps, a small number of lamps may undergo unusual growth at the electrode protrusions. Unusual protrusion growth is linked to extreme decreases in lamp voltage, preventing the power rating from being supplied to the lamp and decreasing lamp luminance. By repeating period C at the predetermined time interval k, the growth effect on the protrusion 23 is intermittently suppressed, thus suppressing any unusual growth therein.

Frequency f3 is set lower than or equal to frequency f1. Here, frequency f3 is ideally within a range of 15 Hz to 150 Hz. The reason is as follows. If frequency f3 is less than 15 Hz, then the anode phase for each electrode 19 is overly long, leading to excessively high temperatures therein. This may cause an overabundance of tungsten to evaporate and lead to advanced deterioration of the electrode 19. On the other hand, if frequency 13 is more than 150 Hz, then the anode phase is overly brief, potentially leading to a decrease in the reduction effect caused by anodic heating in the electrodes 19.

Also, if period C is greater than 50 cycles, then despite frequency f3 being within a range of 15 Hz to 50 Hz, an appropriate protrusion shape may not be obtainable as the protrusion 23 growth period is suppressed for an overly long time. On the other hand, if period C is shorter than 5.5 cycles, then the temperature of the electrodes 19 may not increase enough during each anode phase. This may prevent the growth effect on the protrusion 23 from being suppressed.

Therefore, the duration of period C is preferably selected so as to fall within a range of 5.5 cycles to 50 cycles.

Time interval k is ideally set within a range of 1 second to 300 seconds. The reasoning is as follows. If interval k is longer than 300 s, then the occurrence frequency of period C is overly low. This may make constraint of the growth effect on the protrusions 23 effectively unobtainable. On the other hand, if interval is less than one second, then the occurrence frequency of period C is overly high. This may lead to exaggerated constraint of the growth effect on the protrusion 23, potentially making an appropriate protrusion shape unobtainable.

Period B precedes and follows every iteration of period C for the following reasons.

Suppose that period A at frequency f1 precedes and follows every iteration of period C. In such a case, whenever a change occurs from period C to period A, i.e., a frequency change from frequency f3 to frequency f1, and whenever a change occurs from period A to period C, i.e., a frequency change from frequency f1 to frequency f3, an excessive amount of tungsten may evaporate as both frequency f3 and frequency f1 are low frequencies. This may lead to advanced deterioration of the electrodes 19, overall.

(Lighting Device Operations)

An example of the operations of the lighting device 3 pertaining to Embodiment 3 area described below, with reference to the flowchart shown in FIG. 17.

Figure 17:
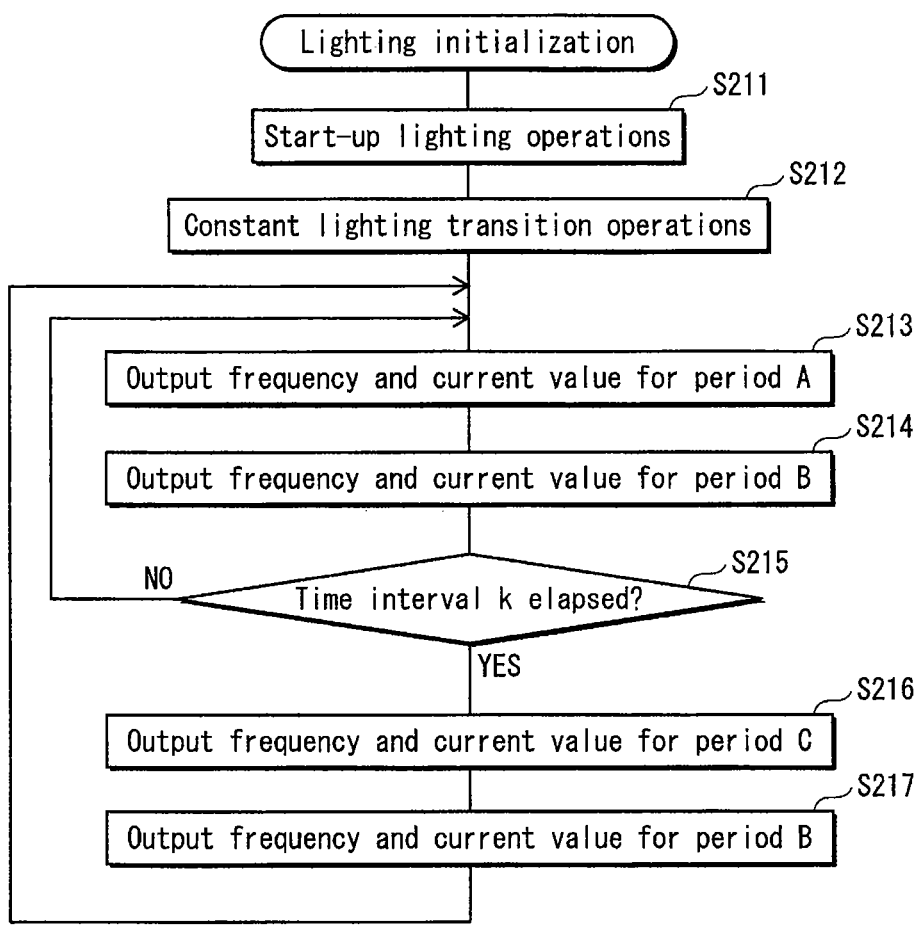
FIG. 17 is a flowchart explaining the operations of the lighting device.

As shown in FIG. 17, the operations of the lighting device 3 pertaining to Embodiment 3 are similar to those of the lighting device 3 pertaining to Embodiment 2 (S113 through S123 from FIG. 13) in that they include controlling the output of current value I1 and of current value I2 during period A (S213) and controlling the output of current value I1 and current value I2 during period B (S214). However, unlike the operations of the lighting device 3 pertaining to Embodiment 2, which do not include controlling period C at frequency f3, the operations of the lighting device 3 pertaining to Embodiment 3 do include controlling period C at frequency f3 so as to cause alternation of current value I1 and current value I2 over time interval k (S215 and S216). The operations identical to those of FIG. 13 are omitted for simplicity.

In the present Embodiment, the microcomputer 11 registers, as additional parameters, the duration of period C and the duration of period c2 within period C.

The following explanations begin after the constant lighting transfer operation (S212).

Much like in Embodiment 1 and Embodiment 2, after the constant lighting transition operations, the microcomputer 11 receives the signals output by the lamp current detector 8 and the lamp voltage detector 9, ordinarily calculates the average current needed to maintain the high-pressure mercury lamp 4 at the power rating P, and controls the DC/DC converter 5 by having a current control signal sent from the PWM control circuit 12 to the DC/DC converter 5.

First, the microcomputer 11 arranges for the frequency and current value to be output during period A. Given that S213 is identical to S113 through S117 from FIG. 13, explanation thereof is omitted.

Then, the microcomputer 11 performs output control of the frequency and current value during period B. Given that S214 is identical to S118 through S123 from FIG. 13, explanation thereof is omitted.

Until time interval k has elapsed (No in S215), the microcomputer 11 repeats S213 and S214 so as to cause period A and period B to repeatedly alternate.

In order to perform lighting operations, once time interval k has elapsed (Yes in S215), the microcomputer 11 performs output control of the frequency and current value for period C (S216), changes the lamp current from frequency f2 for period B to frequency f3 for period C, and repeatedly alternates the magnitude of the current between current value I2 and current value I1 within period C.

Next, the microcomputer 11 performs output control of the frequency and the current value for period B (S217). Afterward, the process returns to S213 and the set of S213 through S217 is repeated until the lighting switch is switched OFF.

According to the above-described operations, period C at frequency f3 (the third frequency), which is lower than or equal to frequency f1, is repeated every predetermined time interval k. During this predetermined time interval, period A and period B are repeated in alternation. Also, during each iteration of periods A, B, and C, the magnitude of the current alternates between current values I2 and I1, and current value I2 is repeatedly supplied over regular repetition interval α.

In the present Embodiment, time interval k is the time from the initialization of period C until the initialization of the next period C. Thus, after the constant lighting transfer operation (S212) and before the initialization of the first period C, period A and period B go through several repetitions during the extra time of period C, without period C being included in the ongoing time interval k. However, this has a minimal effect, and no unusual growth in the electrode protrusions is likely to occur due to these repetitions of period A and period B. For the most part, during the time from the constant lighting transfer operation (S212) to the initialization of the first period C (S216), a variation of the present Embodiment may be employed, such as one involving a period C shortened by more than time interval k.

[Projector]

Figure 18:
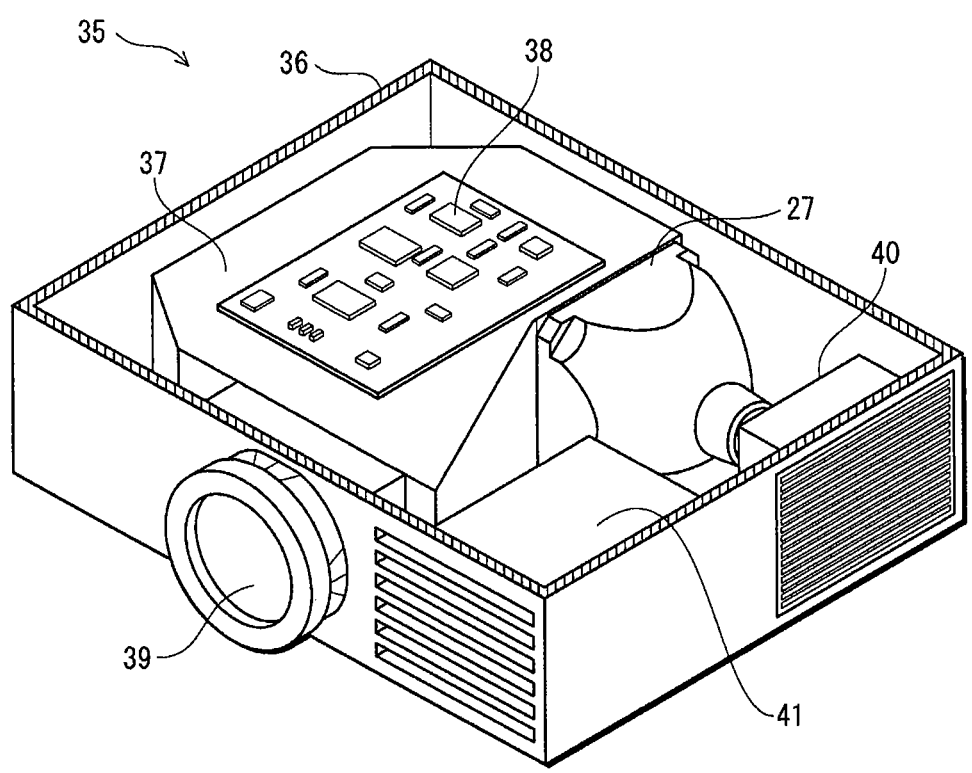
FIG. 18 is a perspective diagram showing the overall structure of a front projector as a projector pertaining to Embodiment 4 of the present invention.
Figure 19:
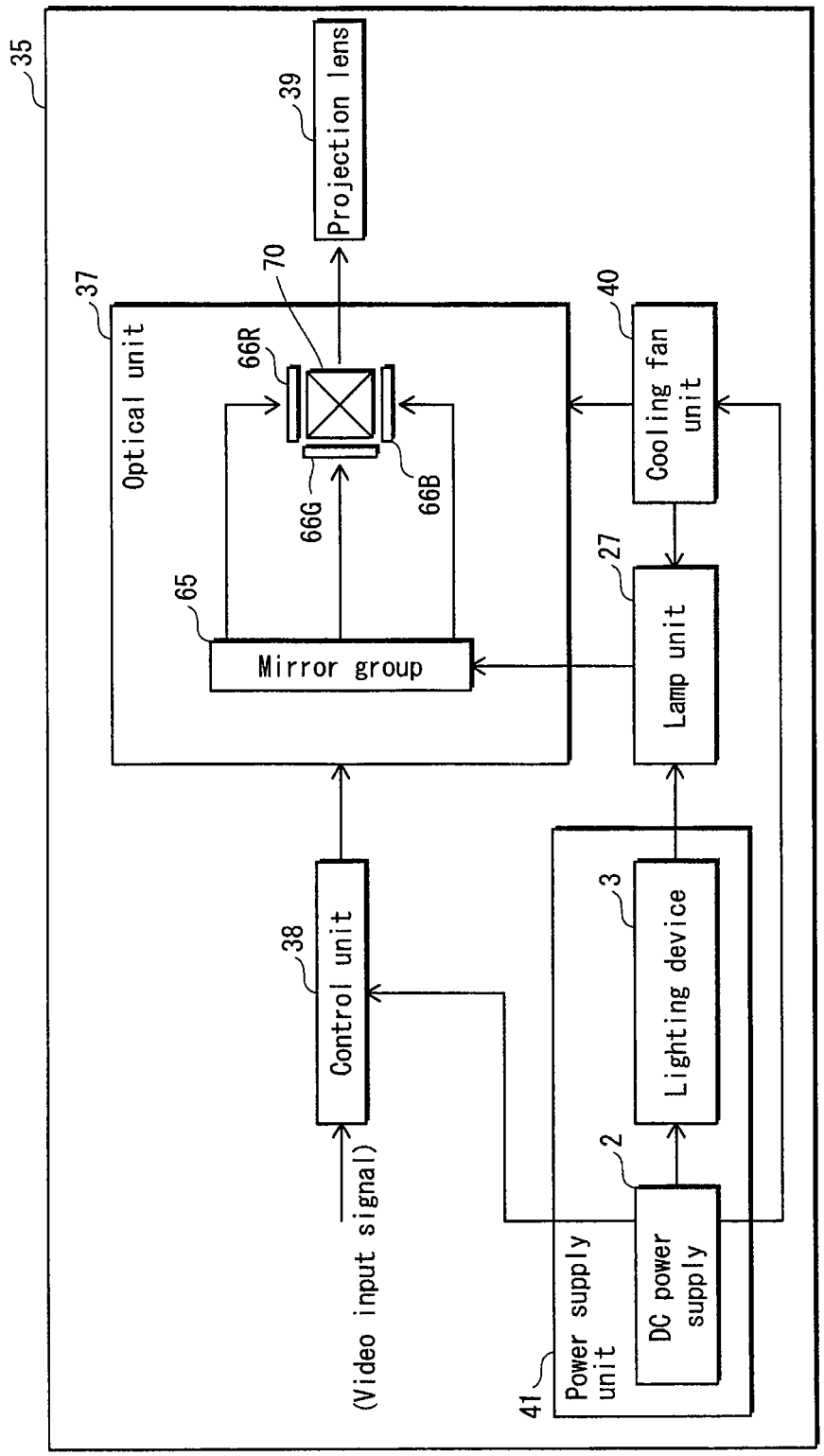
FIG. 19 is a block diagram illustrating the structure of the front projector.
Figure 20:
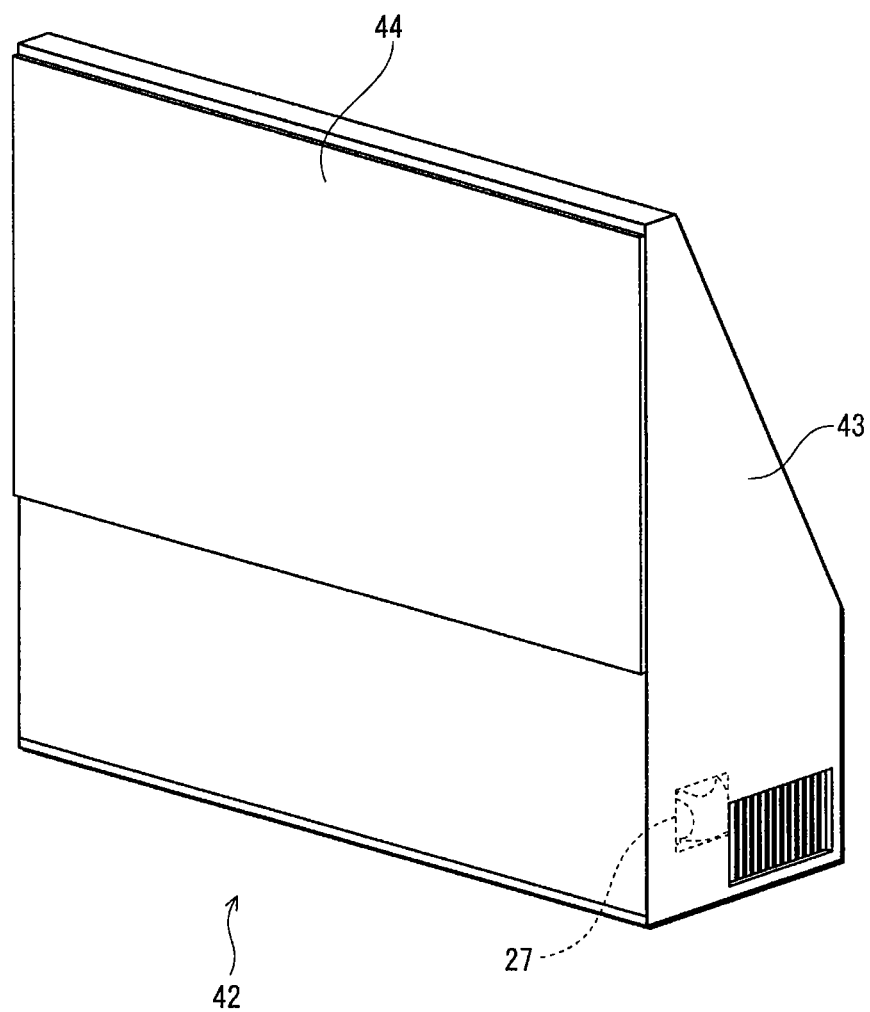
FIG. 20 is a perspective diagram of the overall structure of a rear projector.

The following describes a projector pertaining to Embodiment 4, with reference to FIGS. 18 through 20.

FIG. 18 is a perspective diagram of the overall structure of a front projector 35. The front projector 35 is a projector that projects images on a (non-diagrammed) screen arranged ahead. The front projector 35 uses a lamp unit 27 having the high-pressure mercury lamp 4 of the above-described Embodiments as a light source.

As shown in FIG. 18, the front projector 35 has a casing 36 that further includes an optical unit 37, a control unit 38, a projection lens 39, a cooling fan unit 40, and a power supply unit 41. FIG. 18 illustrates the casing 36 with the top removed in order to facilitate illustration of the front projector 35 structure.

As shown in FIG. 19, the optical unit 37 of the front projector 35 uses three transmissive liquid crystal panels as image display devices.

FIG. 19 is a block diagram illustrating the structure of the front projector 35.

As shown, the optical unit 37 has a mirror group 65, which includes dichroic mirrors, the three transmissive liquid crystal panels 66R, 66G, and 66B corresponding to the three primary colors R, G, and B, and a prism 70. The light output by the lamp unit 27 is split into three colors R, G, and B upon passing through the mirror group 65. The light of each color then passes through the corresponding liquid crystal panel 66R, 66G, or 66B. The liquid crystal panels 66R, 66G, and 66B are driven by the control unit 38 so as to display images according to video signals corresponding to each color R, G, and B. The light in each color R, G, and B passing through the liquid crystal panels is collected by the prism 70 and displayed on the screen via the projection lens 39.

The power supply unit 41 includes the DC power supply 2 and the lighting device 3. The power supply unit 41 supplies power to the control unit 38, the lamp unit 27, the cooling fan unit 40, and so on by cycling between the power appropriate to each.

Thus, the front projector 35 comprises the lighting device 3 pertaining to the above-described Embodiments and can thus alternate between providing, to the high-pressure mercury lamp 4 of the lamp unit 27, AC current at frequency f1 for period A and at frequency f2 for period B, and can further switch between current value I1 and current value I2 so as to provide current value I2 at a predetermined time interval. Accordingly, the longevity of the high-pressure mercury lamp 4 acting as a light source is realized, and the front projector 35 is made to require less frequent maintenance.

The above example describes an example using three transmissive liquid crystal panels as the image display device. However, the present invention is not limited in this manner. Three reflective liquid crystal panels, such as LCOS (Liquid Crystal on Silicon) or the like may be used, or the image display device may use DLP (Digital Light Processing, registered trademark of Texas Instruments) with three DMDs (Digital Micromirror Devices). Other similar variations are also possible.

FIG. 20 is a perspective diagram of the overall structure of a rear projector 42.

The rear projector 42 includes the lamp unit 27, an optical unit, a projection lens, a mirror, and a high-pressure discharge lamp lighting device (none diagrammed), all contained in a casing 43. The image projected by the projection lens and reflected by the mirror is then projected as an image display from the back of a transmissive screen 44. As such, the rear projector 42 can also alternate between providing, to the high-pressure mercury lamp 4 of the lamp unit 27, AC current at frequency f1 for period A and at frequency f2 for period B, and can further switch between current value I1 and current value I2 so as to provide current value I2 at a predetermined time interval. Accordingly, the longevity of the high-pressure mercury lamp 4 acting as a light source is realized, and the rear projector 42 is made to require less frequent maintenance.

The above explanations describe a high-pressure discharge lamp lighting device pertaining to the present invention, as well as a high-pressure discharge lamp apparatus using the device, projectors using the high-pressure discharge lamp apparatus, and a lighting method for the high-pressure discharge lamp. However, the present invention is not limited to these aspects. For example, the following variations are also possible.

[Variations]

Figure 21A:
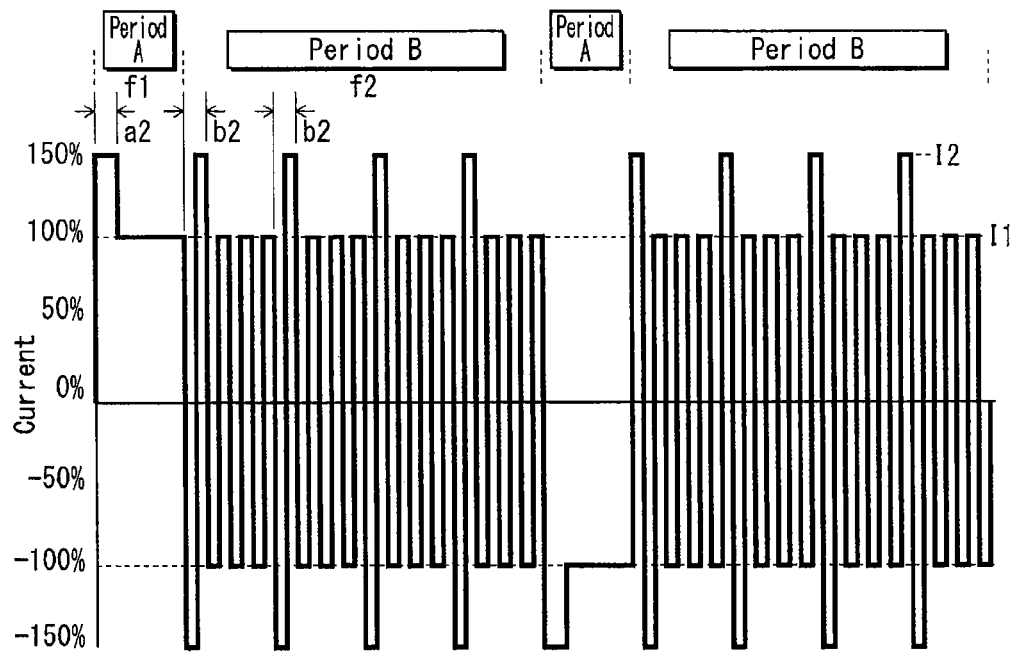
FIGS. 21A and 21B are diagrams showing AC current waveforms output by the lighting device pertaining to variations, where 21A pertains to variation (1) and 21B pertains to variation (2).

(1) In the above-described Embodiments, the periods a2, b2, and c2 during which current is supplied at current value I2 have a duration of one unit, where a unit is one half-cycle of frequency f2. However, the invention is not limited in this manner. Periods a2 and b2 may have a duration of two or more such units. For example, as shown in FIG. 21A, the duration of period a2 and period b2 is two units of one half-cycle of frequency f2. In such a case, the deterioration of the tip portions of the pair of electrodes is more effectively suppressed and, depending on the lamp settings, expansion of the inter-electrode distance is more effectively suppressed. Provided that the duration of period b2 is a natural number of units, the timing at which switching from current value I1 to current value I2 is performed matches polarity reversals of frequency f2 within period B. Thus, adverse effects are avoided, such as light luminance changes becoming humanly perceptible, which may result from discrepancies between polarity reversal timing and current value switching.

Ideally, the number of units during which current is provided at current value I2 within each iteration of period B is no more than half the total number of units included in period B. This is due to the fact that, when current is supplied at current value I2 for more than half of the units within period B, the temperature of the tip portions of the electrodes grows overly high, which may lead to a loss of effectiveness in suppressing the deterioration thereof. As shown in FIG. 21A, the repetition interval for current at current value I2 has a duration of seven units.

Figure 21B:
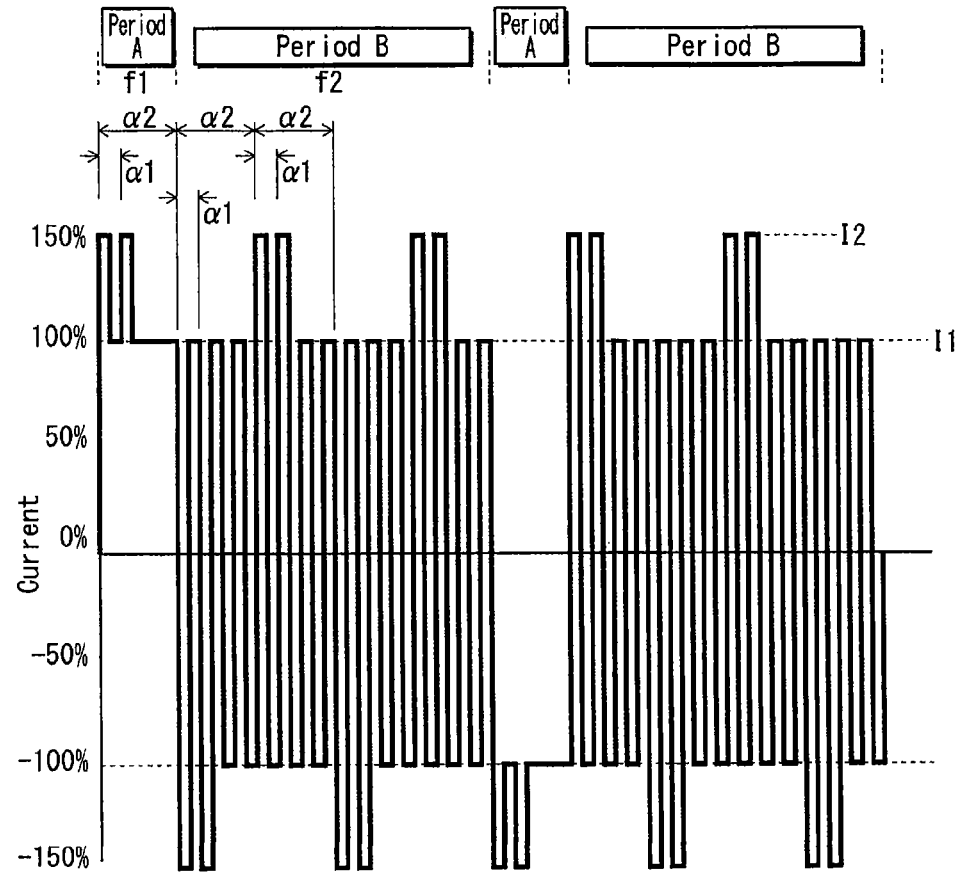

(2) In the above-described Embodiments, the repetition interval α is uniform. However, a structure involving a combination of time intervals is also possible. As shown in FIG. 21B, current at current value I2 is supplied over a natural number of units, which alternate as a group. Specifically, one group is made up by providing current at current value I2 twice over the duration of one half-cycle of frequency f2. Each period A includes one group while each period B includes four groups. As shown in FIG. 21B, the repetition interval includes the pair of α1, the interval at which current value I2 is provided within one group, and of α2, the interval at which the groups are repeated. Here, repetition interval α1 has a duration of two units while repetition interval α2 has a duration of seven units, one unit being one half-cycle of frequency f2. Furthermore, the time between the end of one group and the beginning of the next group is an even number (e.g. 4) of half-cycles of the second frequency f2. Therefore, during period B, groups appear in alternation between positive and negative polarities, thus enabling the effects of the AC current supplied to the pair of electrodes to be balanced. According to this structure, the deterioration of the tip portions of the pair of electrodes is more effectively suppressed and, depending on the lamp settings, expansion of the inter-electrode distance is more effectively suppressed.

(3) In the above-described Embodiments, during period B, the repetition interval for current at current value I2 is seven units. However, the repetition interval is not limited in this manner. The repetition interval may also be adjusted as appropriate to lamp characteristics. As long the repetition interval is an odd number of units, then as outlined in the above-described Embodiments, the current at current value I2 appears to alternate between positive and negative polarity.

Figure 22A:
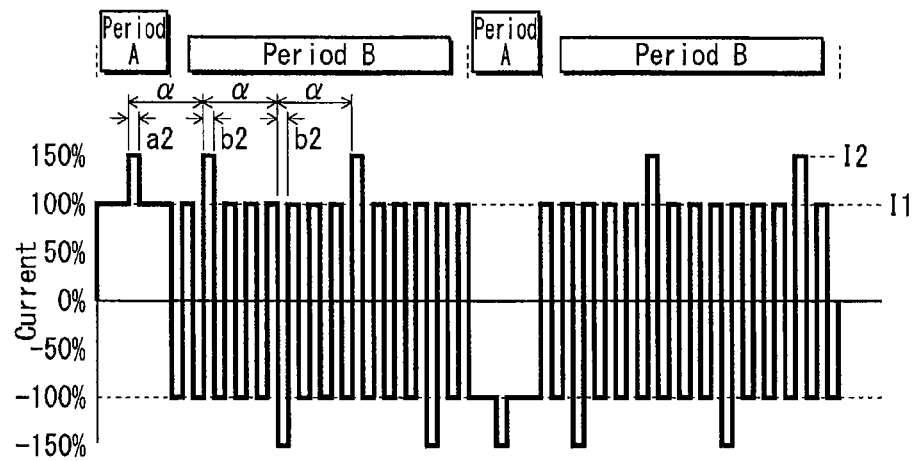
FIGS. 22A, 22B, and 22C are diagrams showing AC current waveforms output by the lighting device pertaining to variation (4).
Figure 22B:
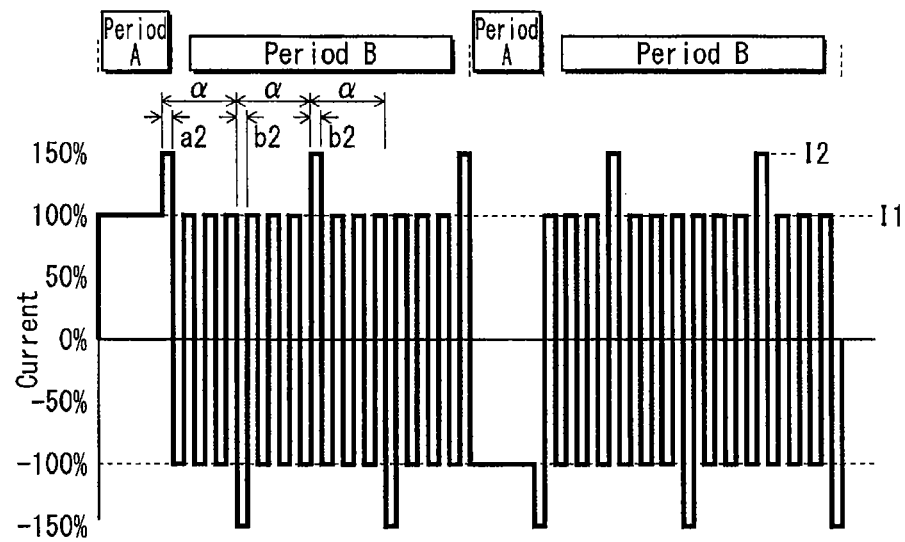
Figure 22C:
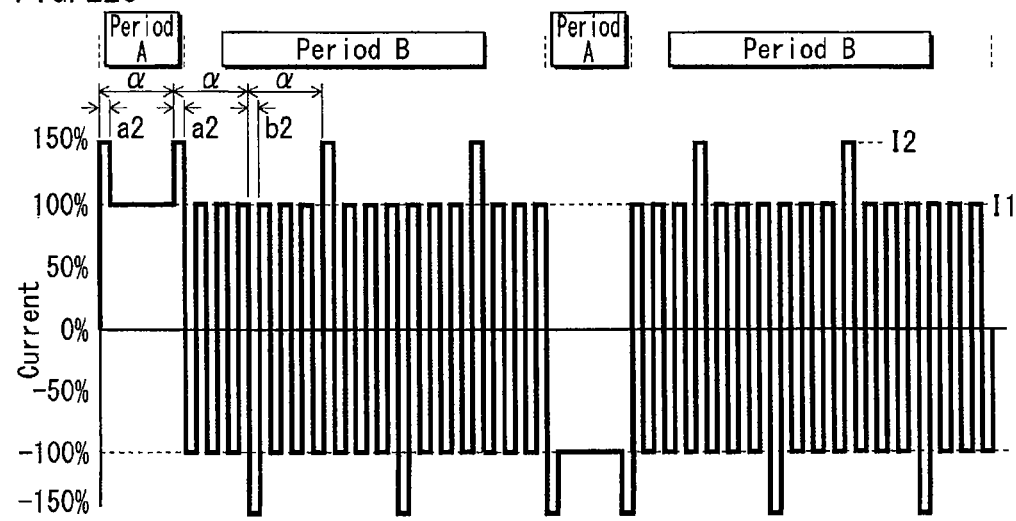

(4) In the above-described Embodiments, period a2, during which current is supplied at current value I2, begins at the beginning of period A. However, the invention is not limited in this manner. For example, period a2 may begin in the middle of period A as shown in FIG. 22A, or may end at the end of period A as shown in FIG. 22B, or each period A may include two periods a2, one beginning at the beginning of period A and the other ending at the end of period A. In FIGS. 22A, 22B, and 22C, a uniform repetition interval α is established so that the time between period a2 and period b2, as well as the time between one iteration of period b2 and the next, remain even. Also, the AC current waveform of FIG. 22C may have, for example, the AC current at a frequency of 46 Hz during period A and at a frequency of 368 Hz during period B, while the duration of period A may be 0.5 cycles and that of period B may be 17 cycles.

Figure 23A:
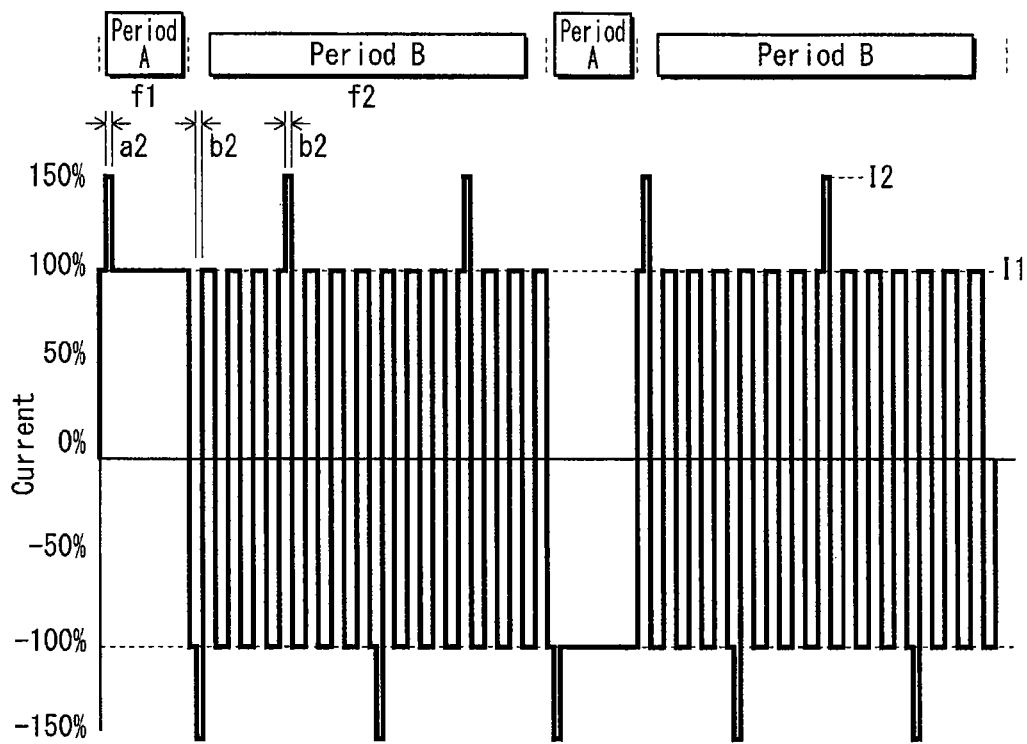
FIGS. 23A and 23B are diagrams showing AC current waveforms output by the lighting device pertaining to variations, where 23A pertains to variation (5) and 23B pertains to variation (6).

(5) As shown in FIG. 23A, the duration of period a2 and of period b2 may be less than one unit. Under such circumstances, by adjusting the timing of polarity reversals during period B so as to coincide with the beginning and end of period b2, lamp flickering is suppressed relative to cases where polarity reversals do not thus coincide.

Figure 23B:
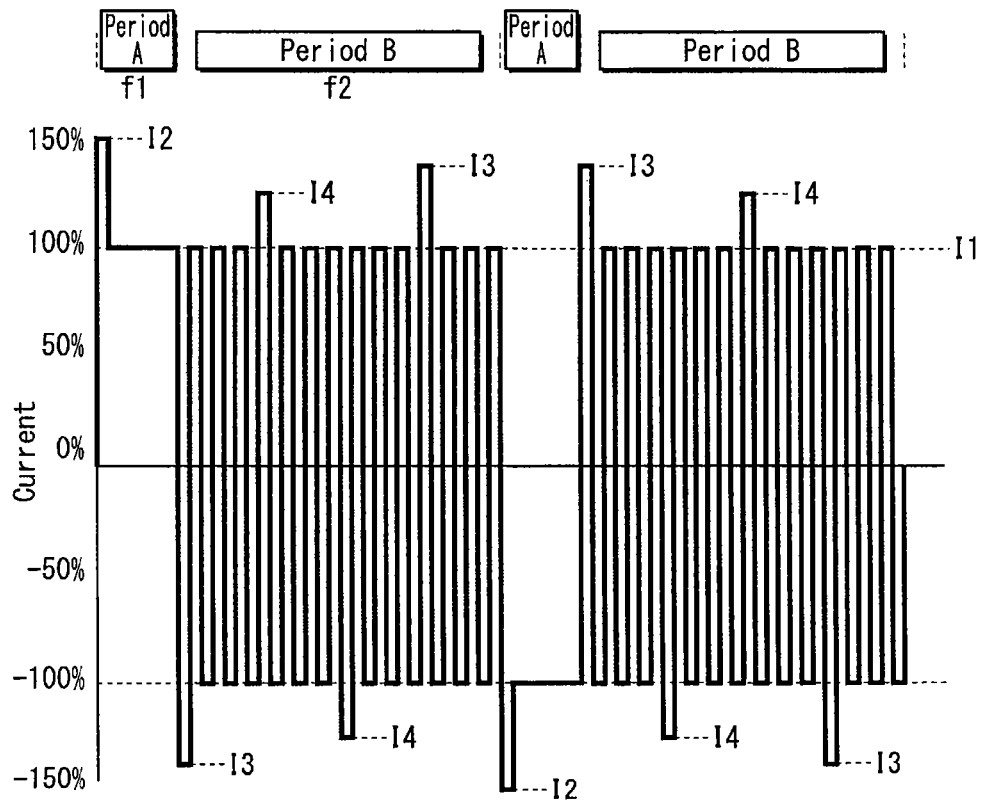

(6) In the above-described Embodiments, the second current has a single current value I2. However, the second current may also take on a plurality of current values. Specifically, as shown in FIG. 23B, the second current used in period A has current value I2 while the second current used in period B takes on current values I3 and I4. Among the current values illustrated in FIG. 23B, I2 is the highest, I4 is the lowest, and I3 is intermediate. As such, by setting a plurality of current values for the second current, the tungsten accumulation effect imparted to the tip portions of the electrodes is more finely adjustable. In FIG. 23B, three current values are included, I2 being the highest, I4 being the lowest, and I3 being intermediate. Accordingly, the lamp flickering caused by changing the current value when the second current is supplied is made difficult for human eyes to perceive.

(7) According to the above-described Embodiments, period A and period B repeat in alternation as the frequency of the AC current switches between the first frequency and the second frequency. However, this switching of frequencies may also involve three or more values, with an additional fourth or fifth frequency. If period C is in use, then the aforementioned three or more values may be included in the predetermined time interval repeated in every iteration of period C.

(8) In Embodiment 3, control is applied such that each iteration of period C is preceded and followed by interval B. However, the invention is not limited in this regard. Each period C may instead be preceded, followed, or bracketed by a period A.

(9) In the above-described Embodiments, a high-pressure mercury lamp having a power rating of 360 W is used as the high-pressure mercury lamp 4. However, the invention is not limited in this manner. Any high-pressure mercury lamp having a power rating within a range of, for instance, 80 W to 1000 W may be used to achieve the above-described effects.

(10) In the above-described Embodiments, a specific high-pressure discharge lamp is described as the high-pressure mercury lamp 4. However, the invention is not limited in this manner. The above-described effects may also be obtained using widely-known short-arc metal halide lamps or similar. However, the effects of the present invention are most remarkably achieved with a high-pressure mercury lamp having an enclosed mercury volume ranging from 150 mg/cm$^3$ to 390 mg/cm$^3$, an enclosed concentration of a halogen ranging from $1 \times 10^{-10}$ mol/cm$^3$ to $1 \times 10^{-4}$ mol/cm$^3$, and an inter-electrode distance ranging from 0.5 mm to 2.0 mm. This is due to the fact that a high-pressure mercury lamp with the above parameters causes a large amount of electrode material to be evaporated during lamp lighting, while also causing a large amount of the electrode material to return through the halogen cycle and accumulate. This greatly affects control of the electrode shape as performed with the lighting method of the present invention and by lighting the lighting device of the present invention.

(11) On occasion, this type of high-pressure discharge lamp apparatus 1 may be provided with a light-adjusting mechanism that gradually changes the lamp power. That is, while constant power control is performed to maintain a uniform power for which the lamp is rated (such as 360 W) while in normal mode, constant power control may be performed the same lamp in light-adjusting mode to reduce the lamp power by 20%, or to 288 W. When the high-pressure discharge lamp apparatus 1 of the above-described Embodiments is used with such a light-adjusting mechanism, the constant power listed above is to be taken as the power of the normal mode, while the light adjusting mode uses a different constant power.

(12) In the above-described Embodiments, the operations of the lighting device are executed by a microcomputer or similar using the functions (software) of a calculation processing device. However, the invention is not limited in this manner. Analogue circuits, logic circuits or similar may be used to form control logic (hardware) and thus execute the operations.

INDUSTRIAL APPLICABILITY

The present invention is widely applicable to a high-pressure discharge lamp apparatus or to a projector or similar that makes use of a high-pressure discharge lamp apparatus.

REFERENCE SIGNS LIST

1 High-pressure discharge lamp apparatus
2 DC power supply
3 Lighting device
4 High-pressure mercury lamp
5 DC/DC converter
6 DC/AC inverter
7 High-voltage generator
8 Lamp current detector
9 Lamp voltage detector
10 Controller
11 Microcomputer
12 (PWM) control circuit
15 Arc tube
16 Light-emitting unit
19a, 19b Electrodes
22a, 22b Tip portions
23a, 23b Protrusions
27 Lamp unit
35 Front projector
42 Rear projector
f1, f2, f3 Frequencies (first, second, third)
I1, I2 Current values (first, second)
k (Predetermined) Time interval
α Repetition interval (for second current value)

The invention claimed is:

1. A high-pressure discharge lamp lighting device lighting a high-pressure discharge lamp by supplying alternating current thereto, the high-pressure discharge lamp having an arc tube in which a halogen substance is enclosed and in which a pair of electrodes are disposed, each of the electrodes having a tip portion on which a protrusion is formed, comprising:

a frequency switching unit switching a frequency of the alternating current supplied to the high-pressure discharge lamp between a first frequency and a second frequency in accordance with a frequency control signal, the second frequency being higher than the first frequency;

a current switching unit switching a magnitude of the alternating current between a first current magnitude and a second current magnitude in accordance with a current control signal, the second current magnitude being greater than the first current magnitude; and a control unit inputting the frequency control signal to control the frequency switching unit and inputting the current control signal to control the current switching unit, wherein controlled by the control unit, the frequency switching unit introduces a period A of providing the alternating current at the first frequency and a period B of providing the alternating current at the second frequency, the periods repeating in alternation, and controlled by the control unit, the current switching unit switches, for one half-cycle of the alternating current at the first frequency, between the second current magnitude for a portion of period A and the first current magnitude for a remainder of period A.

2. The high-pressure discharge lamp lighting device of claim 1, wherein
the control unit further controls the current switching unit such that:
period B includes two or more units of one half-cycle of the alternating current at the second frequency;
the second current magnitude is supplied over a subset of the units; and
the first current magnitude is supplied over the remainder of the units.

3. The high-pressure discharge lamp lighting device of claim 2, wherein
the second current magnitude is supplied at a regularly repeated interval.

4. The high-pressure discharge lamp lighting device of claim 3, wherein
the interval at which the second current magnitude is supplied falls within a range of 1 millisecond to 20 milliseconds.

5. The high-pressure discharge lamp lighting device of claim 3, wherein
for each iteration of period A, the second current magnitude is supplied for one or more intervals per half-cycle of the first frequency, and
the second current magnitude is supplied with positive polarity and with negative polarity during each iteration of period B.

6. The high-pressure discharge lamp lighting device of claim 3, wherein
during each interval, the second current magnitude is supplied for a duration equivalent to a natural number of half-cycles of the second frequency.

7. The high-pressure discharge lamp lighting device of claim 3, wherein
for each iteration of period A, the second current magnitude is supplied for one or more intervals per half-cycle of the first frequency, and
the second current magnitude is supplied within each half-cycle of the first frequency for a total duration equivalent to one quarter-cycle or less of the alternating current at the first frequency.

8. The high-pressure discharge lamp lighting device of claim 3, wherein
the second current magnitude is repeated as a group provided over the interval, separated by a duration equivalent to a natural number of half-cycles of the second frequency, and
each iteration of period B includes two or more repetitions of the group.

9. The high-pressure discharge lamp lighting device of claim 8, wherein
a time span between the end of one repetition of the group and the beginning of the next repetition of the group is equivalent to an even number of half-cycles of the second frequency.

10. The high-pressure discharge lamp lighting device of claim 3, wherein
for each iteration of period B, the second current magnitude is supplied for no more than half of the total number of half-cycle units included in the iteration.

11. The high-pressure discharge lamp lighting device of claim 1, wherein
the second current magnitude is no more than twice the first current magnitude.

12. The high-pressure discharge lamp lighting device of claim 1, wherein
the frequency switching unit switches between the first frequency, the second frequency, and a third frequency that is lower than or equal to the first frequency,
controlled by the control unit, the frequency switching unit introduces a period C of providing the alternating current at the third frequency, period C being longer than period A and being repeated at a predetermined time interval, and
period A and period B repeat in alternation between iterations of period C.

13. A high-pressure discharge lamp apparatus comprising:
a high pressure discharge lamp having an arc tube in which a halogen substance is enclosed and in which a pair of electrodes are disposed, each electrode having a tip portion on which a protrusion is formed, and
the high-pressure discharge lamp lighting device of claim 1 lighting the high-pressure discharge lamp.

14. A projector comprising the high-pressure discharge lamp apparatus of claim 13.

15. A high-pressure discharge lamp lighting method for lighting a high-pressure discharge lamp by supplying alternating current thereto, the high-pressure discharge lamp having an arc tube in which a halogen substance is enclosed and in which a pair of electrodes are disposed, each of the electrodes having a tip portion on which a protrusion is formed, comprising the steps of:
switching a frequency of the alternating current between a first frequency and a second frequency, the second frequency being higher than the first frequency, and switching a magnitude of the alternating current between a first current magnitude and a second current magnitude, the second current magnitude being greater than the first current magnitude; wherein
a period A of providing the alternating current at the first frequency and a period B of providing the alternating current at the second frequency repeat in alternation, and
for one half-cycle of the alternating current at the first frequency, the second current magnitude is provided for a portion of period A and the first current magnitude is provided for a remainder of period A.

16. The high-pressure discharge lamp lighting method of claim 15, wherein
the frequency of the alternating current is switched between the first frequency, the second frequency, and a third frequency that is lower than or equal to the first frequency,
the alternating current is provided at the third frequency at a predetermined interval,
a period C of providing the alternating current at a third current magnitude is repeated at the predetermined time interval, period C being longer than period A, and
period A and period B repeat in alternation between iterations of period C.

17. The high-pressure discharge lamp lighting method of claim 16, wherein
between each of the predetermined time intervals, period C is followed by period B, which is followed by period A and period B repeating in alternation such that period B occurs last.

18. The high-pressure discharge lamp lighting method of claim 16, wherein
for each iteration of period C, the alternating current is provided beginning in a phase opposite the phase at which the preceding iteration of period C begins.

* * * * *